United States Patent
Luqman

(10) Patent No.: US 12,469,333 B2
(45) Date of Patent: Nov. 11, 2025

(54) EFFICIENT TWO-STREAM NETWORK SYSTEM AND METHOD FOR ISOLATED SIGN LANGUAGE RECOGNITION USING ACCUMULATIVE VIDEO MOTION

(71) Applicants: KING FAHD UNIVERSITY OF PETROLEUM AND MINERALS, Dhahran (SA); Saudi Data and Artificial Intelligence Authority (SDAIA), Riyadh (SA)

(72) Inventor: Hamzah Abdullah Luqman, Dhahran (SA)

(73) Assignees: KING FAHD UNIVERSITY OF PETROLEUM AND MINERALS, Dhahran (SA); Saudi Data and Artificial Intelligence Authority (SDAIA), Riyadh (SA)

( * ) Notice: Subject to any disclaimer, the term of this patent is extended or adjusted under 35 U.S.C. 154(b) by 317 days.

(21) Appl. No.: 18/460,897

(22) Filed: Sep. 5, 2023

(65) Prior Publication Data
US 2025/0078576 A1  Mar. 6, 2025

(51) Int. Cl.
*G06V 40/20* (2022.01)
*G06V 10/34* (2022.01)
(Continued)

(52) U.S. Cl.
CPC .............. *G06V 40/28* (2022.01); *G06V 10/34* (2022.01); *G06V 10/82* (2022.01); *G06V 20/40* (2022.01)

(58) Field of Classification Search
CPC ........ G06V 40/28; G06V 10/82; G06V 20/40; G06V 10/34
See application file for complete search history.

(56) References Cited

U.S. PATENT DOCUMENTS

2021/0279453 A1   9/2021   Luqman et al.

FOREIGN PATENT DOCUMENTS

CN   109920309 A   6/2019

OTHER PUBLICATIONS

Debajit Sarma et al, "Two-stream fusion model using 3D-CNN and 2D-CNN via video-frames and optical flow motion templates for hand gesture recognition", 2022, Innovations in Systems and Software Engineering (14 Pages) (Year: 2022).*

(Continued)

*Primary Examiner* — David F Dunphy
(74) *Attorney, Agent, or Firm* — Oblon, McClelland, Maier & Neustadt, L.L.P.

(57) ABSTRACT

A sign language recognition system is described. The system includes a motion sensor, a processing circuitry and a display device. The motion sensor captures and records a dynamic sign language gesture as a sign video stream. The processing circuitry is configured with a key postures extractor, an accumulative video motion (AVM), and a sign recognition network (SRN). The key postures extractor captures main postures of the dynamic sign language gesture by extracting key frames in the sign video stream. The AVM captures motion of the sign video stream frames and transforms the motion in an AVM frame into a single AVM image. The SRN is configured as a convolutional network. The main postures and AVM image are fed into a two-stream network. The features from the two stream network are concatenated and fed into the SRN for learning fused features and performing classification of the sign language gesture.

20 Claims, 17 Drawing Sheets

(51) Int. Cl.
*G06V 10/82* (2022.01)
*G06V 20/40* (2022.01)

(56) References Cited

OTHER PUBLICATIONS

Bindu Verma, "A two stream convolutional neural network with bi-directional GRU model to classify dynamic hand gesture", 2022, J. Vis. Commun. Image R. (12 Pages) (Year: 2022).*

Debajit Sarma, et al., "Two-stream fusion model using 3D-CNN and 2D-CNN via video-frames and optical flow motion templates for hand gesture recognition", Innovations in Systems and Software Engineering, S.I. : Low Resource Machine Learning Algorithms (LR-MLA), Aug. 29, 2022, pp. 1-14.

Hamzah Luqman, et al., "Utilizing motion and spatial features for sign language gesture recognition using cascaded CNN and LSTM models", Turkish Journal of Electrical Engineering & Computer Sciences, vol. 30, No. 7, Article 3, Nov. 28, 2022, pp. 2508-2525.

\* cited by examiner

EFFICIENT TWO-STREAM NETWORK SYSTEM AND METHOD FOR ISOLATED SIGN LANGUAGE RECOGNITION USING ACCUMULATIVE VIDEO MOTION

STATEMENT REGARDING PRIOR DISCLOSURE BY THE INVENTORS

Aspects of this technology are described in an article H. Luqman, "An Efficient Two-Stream Network for Isolated Sign Language Recognition Using Accumulative Video Motion," in IEEE Access, vol. 10, pp. 93785-93798, 2022, doi: 10.1109/ACCESS.2022.3204110. The article was published online Sep. 5, 2022, and is herein incorporated by reference in its entirety.

STATEMENT OF ACKNOWLEDGEMENT

Support received from Saudi Data and AI Authority (SDAIA) and King Fahd University of Petroleum and Minerals (KFUPM) under SDAIA-KFUPM Joint Research Center for Artificial Intelligence Grant JRC-AI-RFP-05 is gratefully acknowledged.

BACKGROUND

Technical Field

The present disclosure is directed to an efficient two-stream network system and a method for isolated sign language recognition using accumulative video motion.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sign language is a primary communication medium for persons with hearing impairments. Sign language is a descriptive language that simultaneously utilizes manual gestures and nonmanual gestures. A majority of the sign words depend on manual movements that use hand motions for interpersonal communication. These signs are usually accompanied with nonmanual gestures including body postures and facial expressions. Nonmanual gestures play an important role in sign languages to convey emotional and linguistic information that cannot be expressed by manual gestures. Additionally, facial expressions are used to distinguish between signs that share the same manual gesture. For example, the sign for "brother" is identical to the sign for "sister" in German sign language; however, their lip patterns differ.

Sign language interpretation involves recognition of the sign gestures and translation. Recognition is the task of identifying sign gestures either in an image(s) or video(s) of a sign language and returning their equivalent meaning in a natural language. The output of the recognition stage can be isolated words or sentences depending on the input provided. Isolated sign recognition systems accept a sign and output an equivalent word in a spoken language. Continuous sign language recognition systems identify a sequence of signs performed continuously and output a set of words in the form of sentences.

Several techniques have been introduced for automatically recognizing various sign languages. Based on a corresponding acquisition device, sign recognizing techniques can be classified into two types: a sensor-based technique, and a vision-based technique. The sensor-based techniques use motion sensors to acquire sign gestures. These sensors can track movements and shapes formed by fingers and hands. However, motion sensors alone can not capture the non-manual gestures that are a basic component of any sign language. Thus, a majority of sign language recognition systems are vision-based where at least one camera is used for sign capturing.

An existing system recognizes ASL digits based on depth images and is configured to extract a set of statistical features and classify the extracted features using a random forest classifier (See: W. Nai, Y. Liu, D. Rempel, and Y. Wang, "*Fast hand posture classification using depth features extracted from random line segments,*" Pattern Recognition, vol. 65, pp. 1-10, 2017). Another existing system employs a Hidden Markov model (HMM) for recognizing 50 signs of ASL. A principal component analysis (PCA) was used for features reduction and an accuracy of 89.1% was reported. (See: M. M. Zaki and S. I. Shaheen, "*Sign language recognition using a combination of new vision based features,*" Pattern Recognition Letters, vol. 32, no. 4, pp. 572-577, 2011). In another system, a PCA with linear discriminant analysis was used and extracted features were classified using SVM, and the accuracies of 94% and 99.8% were reported using the 26 signs of American Sign Language (ASL) and Chinese Sign Language (CSL), respectively. (See: T.-Y. Pan, L.-Y. Lo, C.-W. Yeh, J.-W. Li, H.-T. Liu, and M.-C. Hu, "*Real-time sign language recognition in complex background scene based on a hierarchical clustering classification method,*" in 2016 IEEE Second International Conference on Multimedia Big Data. IEEE, 2016, pp. 64-67).

A sign language alphabet recognition system was described that uses static hand visual features to build a system for recognizing hand and finger gestures representing different sign language alphabets. After hand segmentation, texture based features were extracted by downsampling Gabor-transformed images using multiple scales and orientations. (See: G. M. B. Makhashen, H. A. Luqman, and E.-S. M. El-Alfy, "*Using gabor filter bank with downsampling and svm for visual sign language alphabet recognition,*" in 2nd Smart Cities Symposium (SCS 2019), 2019, pp. 1-6). A fingerspelling recognition system was described that uses a histogram of oriented gradients (HOG) and local binary pattern (LBP) techniques for feature extraction and SVM for classification. (See: H. B. Nguyen and H. N. Do, "*Deep learning for american sign language fingerspelling recognition system,*" in 2019 26th International Conference on Telecommunications (ICT). IEEE, 2019, pp. 314-318). However, the systems and methods described in these references and other conventional sign language recognition systems consider all signs' frames for sign learning and classification, resulting in degraded recognition accuracy due to the variations between the signs performed by different signers. Most conventional systems fail to employ temporal learning techniques for dynamic sign gesture recognition and are therefore unable to learn non-manual gestures efficiently.

Hence, there is a need for a sign language recognition system which effectively captures the spatiotemporal information using a small number of signs' frames.

SUMMARY

An aspect of the present disclosure is a sign language recognition system is described. The system includes a motion sensor for capturing and recording a dynamic sign language gesture as a sign video stream, a processing circuitry and a display device. The processing circuitry is configured with a key postures extractor that captures main postures of the dynamic sign language gesture by extracting key frames in the sign video stream, an accumulative video motion (AVM) module that captures motion of the sign video stream frames and transforms the motion in an AVM frame into a single AVM image while preserving spatiotemporal information of the sign language gesture, and a sign recognition network (SRN) configured as a convolutional network. The main postures and AVM image are fed into a two-stream network. The features from the two stream network are concatenated and fed into the SRN for learning fused features and performing classification of the sign language gesture. The display device outputs the classification as a natural language word.

A further aspect of the present disclosure is a method of recognizing sign language is described. The method includes capturing and recording, via a motion sensor, a dynamic sign language gesture as a sign video stream. The method includes capturing, via a key postures extractor, main postures of the dynamic sign language gesture by extracting key frames in the sign video stream. The method includes capturing, via an accumulative video motion (AVM) module, motion of the sign video stream frames and transforming the motion in an AVM frame into a single AVM image while preserving spatiotemporal information of the sign language gesture. The method includes feeding the main postures and AVM image into a two-stream network. The method includes concatenating features from the two stream network. The method includes feeding the concatenated features into a SRN for learning fused features. The method includes performing classification of the sign language gesture. The method includes outputting, via a display device, the classification as a natural language word.

A further aspect of the present disclosure is a non-transitory computer readable medium having instructions stored therein that, when executed by one or more processor, cause the one or more processors to perform a method of recognizing sign language is described. The method includes capturing and recording, via a motion sensor, a dynamic sign language gesture as a sign video stream. The method includes capturing, via a key postures extractor, main postures of the dynamic sign language gesture by extracting key frames in the sign video stream. The method includes capturing, via an accumulative video motion (AVM) module, motion of the sign video stream frames and transforming the motion in an AVM frame into a single AVM image while preserving spatiotemporal information of the sign language gesture. The method includes feeding the main postures and AVM image into a two-stream network. The method includes concatenating features from the two stream network. The method includes feeding the concatenated features into a SRN for learning fused features. The method includes performing classification of the sign language gesture. The method includes outputting, via a display device, the classification as a natural language word.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
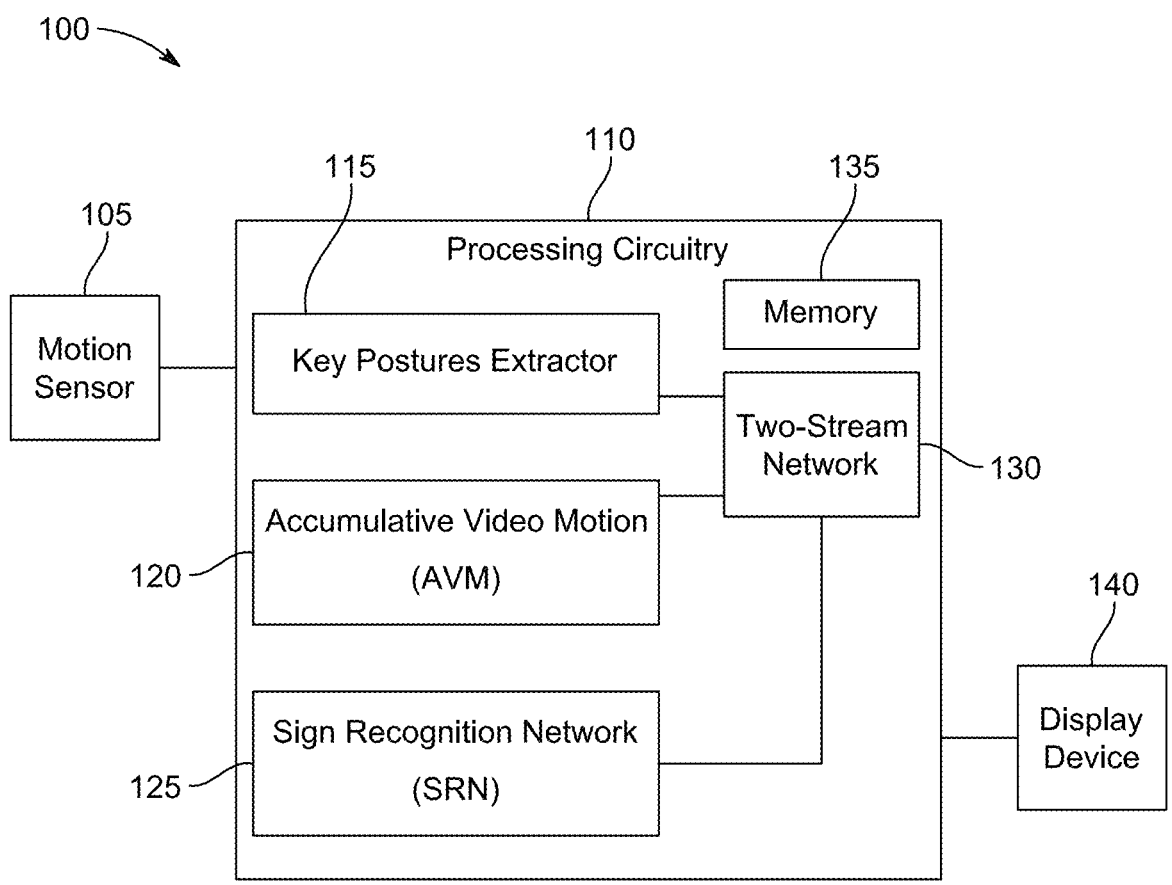
FIG. 1 is a block diagram of a sign language recognition system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Hearing loss is a common problem globally. According to the World Health Organization (WHO), 2.5 billion people (i.e., one in four persons) are predicted to have some degree of hearing loss by 2050; approximately 700 million of these will need hearing rehabilitation. This increases the dependence on sign language, which is the primary communication language for persons with various levels of hearing disabilities.

Sign languages are complete languages with their own grammar and syntax. However, linguistic properties of sign languages differ from those of natural languages. Each sign language has its own dictionary, which is usually limited in size in comparison with the dictionaries of natural languages. Similar to spoken languages, sign languages are diverse; several sign languages are used worldwide, such as American Sign Language (ASL), Chinese Sign Language (CSL), and Arabic Sign Language (ArSL). ArSL is a unified language of several sign languages used in Arabic countries. The ArSL dictionary includes 3200 sign words. The correlation between signs and spoken languages is complex and varies depending on the country. Therefore, countries that share the same spoken language may have different sign languages. For example, although English is the spoken language of the United Kingdom and the United States, they have different sign languages, namely, British sign language and ASL.

Motion is a basic component of sign gestures. Based on the motions involved, signs can be classified into two types: static signs and dynamic signs. The static signs do not involve any motion. These signs depend mainly on the shapes and orientations of the hands and fingers. Images can adequately capture the static signs. Dynamic signs involve manual and/or nonmanual motions of body parts. Dynamic signs represent the majority of the sign words used in the sign language vocabulary. Hence, a video stream can be used to represent signs with a basic motion component.

Aspects of the present disclosure are directed to a sign language recognition system and a method of recognizing sign language. The present disclosure discloses a trainable deep learning network for isolated sign language recognition that can effectively capture spatiotemporal information using a small number of sign frames. Further, a hierarchical sign learning module is disclosed that includes three networks: a dynamic motion network (DMN), an accumulative motion network (AMN), and a sign recognition network (SRN). The system extracts key postures for handling the variations in the sign samples performed by different signers. The DMN uses these key postures to learn the spatiotemporal information pertaining to these signs. The system combines static and dynamic information of the sign gestures into a single frame. The method preserves the spatial and temporal information of the sign frame by fusing the sign's key postures in a forward direction and in a backward direction to generate an accumulative video motion (AVM) frame. The AVM frame is an input to the AMN. The extracted features from the AVM are fused with the DMN features and fed into the SRN for the learning and classification of signs. The method is efficient for isolated sign language recognition, especially for recognizing static signs. The system was evaluated on a KArSL-190 (Arabic sign language dataset) and a KArSL-502 (Arabic sign language dataset), and the obtained results on the KArSL-190 outperformed other conventional systems by 15% in the signer-independent mode. During experiments, the system outperformed the conventional systems on the Argentinian sign language dataset LSA64.

FIG. 1 is a block diagram of a sign language recognition system 100, (hereinafter interchangeably referred to as "the system 100"), according to one or more aspects of the present disclosure. The system 100 includes a motion sensor 105, a processing circuitry 110, and a display device 140.

The motion sensor 105 is configured to capture and record a dynamic sign language gesture as a sign video stream. The motion sensor 105 is configured to sense movements of a user's hand. The motion sensor 105 is configured to provide the sign video stream to the processing circuitry 110. In an example, the motion sensor 105 includes one or more cameras. The one or more cameras are placed spaced apart from one another such that each camera can capture an image data from a different angle. In an aspect, the motion sensor 105 may include a light source which is configured to output light to illuminate the user. In an example, the one or more cameras may include, for example, a high-resolution digital camera, an image capturing sensor, an infrared (IR) camera, a visible light camera, an intensified charge-coupled device (ICCD) camera, an image intensified camera, a Kinect v2 camera, a sensor fused camera, an aircraft panoramic night vision system and the like.

The processing circuitry 110 is cooperatively coupled to the motion sensor 105 and receives the recorded sign video stream from the motion sensor 105. As shown in FIG. 1, the processing circuitry 110 includes a key postures extractor 115, an accumulative video motion (AVM) 120, and a sign recognition network (SRN) 125, a two-stream network 130, and a memory 135.

The memory 135 is configured to store program instructions. The program instructions include a machine learning model that is configured to extract a plurality of sign frames from the received video stream; identify a quality of each image and discard any distorted images or unclear images captured by the motion sensor 105. The program instructions further include a deep learning classifier which is trained to classify the images. According to the present disclosure, the deep learning classifier is a convolutional neural network (CNN). In an aspect, the memory 135 is configured to store the machine learning model and a predefined dataset for training the machine learning model. The program instructions include a program that implements a method for using machine-learning methods to classify each captured image in accordance with embodiments of the present disclosure and may implement other embodiments described in this specification. The memory 135 is configured to store pre-processed data, a plurality of frames, and a plurality of images. The memory 135 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

In an aspect, the processing circuitry 110 is configured to employ preprocessing on the received data (sign video stream) such as filtering and amplifying the received data.

The processing circuitry 110 is configured to fetch and execute computer-readable instructions stored in the memory 135. The processing circuitry 110 is configured to execute a sequence of machine-readable instructions, which may be embodied in a program or software. The instructions can be directed to the processing circuitry 110, which may subsequently program or otherwise be configured to implement the methods of the present disclosure. According to an aspect of the present disclosure, the processing circuitry 110 may be implemented as one or more microprocessors, microcomputers, microcontrollers, digital signal processors, central processing units, state machines, logic circuitries, and/or any devices that manipulate signals based on operational instructions.

The key postures extractor 115 is configured to extract key frames in the received sign video stream. The key postures extractor 115 captures main postures of the dynamic sign language gesture from the extracted key frames. The key postures extractor 115 is configured to track hand joint points and capture hand trajectories by tracking hand joint points. The key postures extractor 115 is configured to extract the key frames by using captured hand trajectories. The key postures extractor 115 is configured to preprocess the hand joint points by smoothing hand locations using a median filter. The median filter is configured to remove outlier joint points. In an embodiment, the key postures extractor 115 extracts the key frames by connecting the hand locations during signing to form a polygon. In an example, sharp changes in hand locations are represented as vertices of the polygon. The key postures extractor 115 is configured to iteratively repeat a reduction algorithm to recompute importance of remaining vertices until N vertices remain in the polygon to obtain a reduced trajectory.

In an aspect, the memory 135 is configured to store the extracted key postures and a connection relationship between the extracted key frames.

The AVM 120 is configured to capture motion of the sign video stream frames (extracted key frames) to generate an AVM frame respectively. After capturing the motion, the AVM 120 transforms the captured motion in the AVM frame(s) into a single AVM image. The AVM 120 is configured to preserve the spatiotemporal information of the sign language gesture by fusing the sign's key postures in forward and backward directions during formation of the AVM image.

The two-stream network 130 is configured to receive the main postures (extracted key frames) and the AVM image from the key postures extractor 115 and the AVM 120, respectively. In an example, a stream of the two-stream network 130 is a dynamic motion network (DMN), and another stream is an accumulative motion network (AMN). The DMN is configured to learn and extract the spatiotemporal information from the extracted key frame of the sign language gesture. The AMN is configured to learn the motion in the AVM image. The AMN produces an RGB image representing the whole sign.

The features from the two-stream network 130 are concatenated. The SRN 125 is coupled to the two-stream network 130 and receives the concatenated features from the two stream network. The SRN 125 is configured to use the concatenated features for learning fused features. The SRN 125 is configured to perform classification of the sign language gesture. The SRN 125 is configured as a convolutional network.

The display device 140 is commutatively coupled to the SRN 125. The display device 140 is configured to receive the classification of the sign language gesture from the SRN 125. The display device 140 is configured to display the received classification from the SRN 125 as a natural language word. In an example, the display device 140 is as a LED matrix, small video display, high-resolution liquid crystal display (LCD), plasma, light-emitting diode (LED), or other devices suitable for displaying the amplified signal.

In one embodiment, the system 100 includes an audio unit which is configured to generate an audio signal corresponding to the natural language word.

Generally, based on body motion, sign gestures can be classified into two types: static gestures and dynamic gestures. Static gestures are motionless gestures, and they depend mainly on the shape, orientation, and articulation of the hands and fingers to convey different meanings. Dynamic gestures employ body movements during the signing. Dynamic gestures represent the majority of signs used in sign languages, whereas static gestures are used mainly for letters, digits, and a few sign words. The recognition of static gestures depends only on spatial information, whereas the recognition of dynamic gestures requires both spatial and temporal information. It is important for a system to recognize the gesture variations among the different signers of the sign. These gesture variations include more than one posture. Another challenge with the recognition of dynamic gestures is a large number of generated frames, especially when the sign gestures are recorded at high frame rates. Some of these frames are often redundant, which increases the recognition time of the systems that process sign video frames for recognizing sign gestures. To address such problems, the present system 100 extracts the key frames from each sign gestures and uses these key frames as input to the recognition system.

Figure 2:
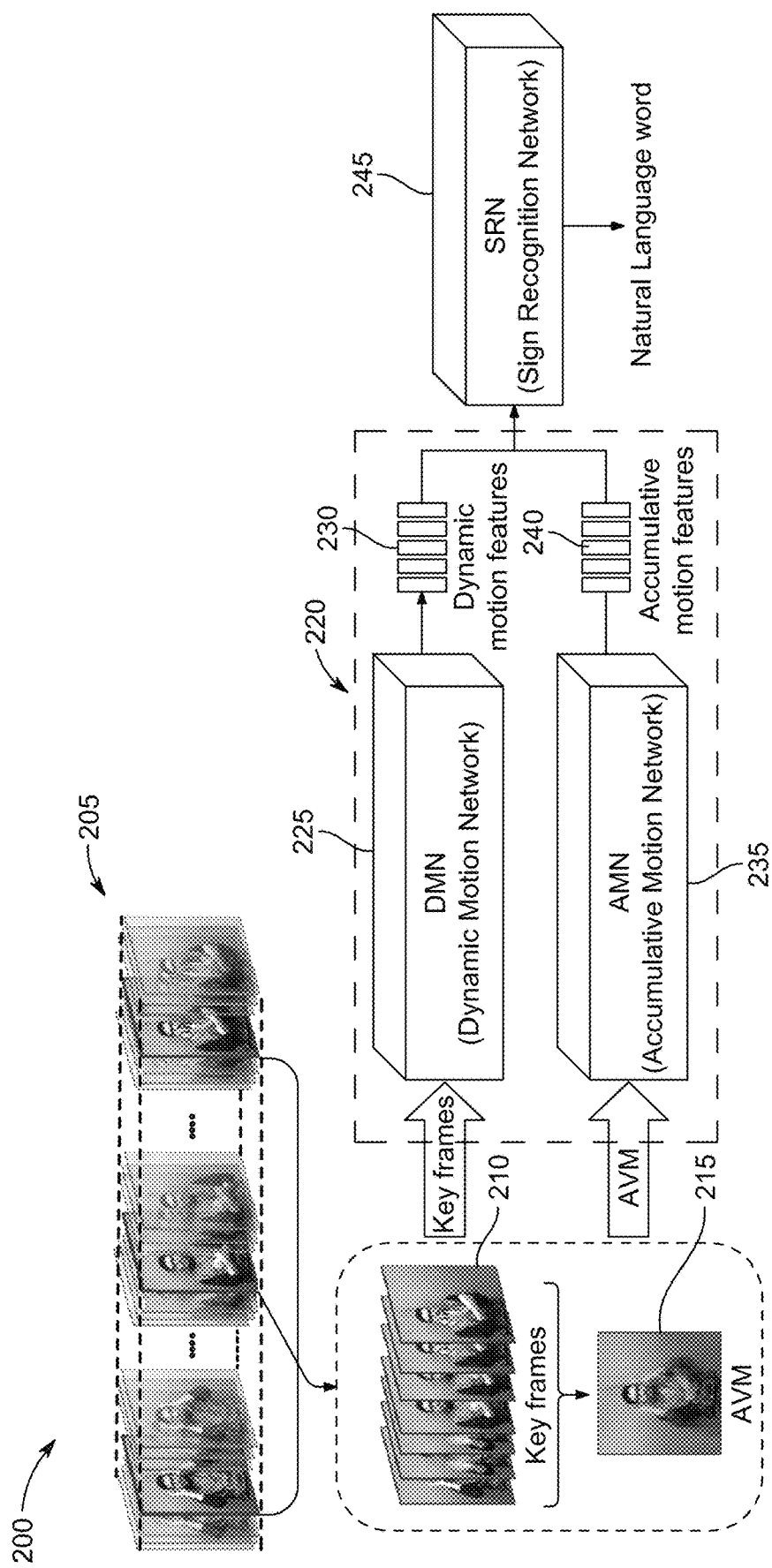
FIG. 2 is a schematic framework of the sign language recognition system, according to certain embodiments.

FIG. 2 is an exemplary schematic diagram of a framework of the sign language recognition system 200, according to certain embodiments. The system 200 employs a trainable deep learning network for sign language recognition that can effectively capture the spatiotemporal information using a reduced number of sign frames, thereby enhancing the efficiency and effectiveness of the system 200. As shown in FIG. 2, the system 200 includes a motion sensor 205, a key postures extractor 210, an AVM 215, a two-stream network 220, and an SRN 245. The hardware construction of the system 100, as shown in FIG. 1 is substantially similar to the sign language recognition system 200 of FIG. 2, and thus the construction is not repeated here in detail for the sake of brevity.

The motion sensor 205 captures and records the dynamic sign language gesture of the user as the sign video stream.

The key postures extractor 210 captures main postures of the dynamic sign language gesture by extracting key frames in the recorded sign video stream.

The AVM 215 captures motion of the sign video stream frames and transforms the motion in the AVM frame into a single AVM image. The AVM 215 preserves spatiotemporal information of the sign language gesture during formation of the AVM image.

The two-stream network 220 is configured to receive the main postures (extracted key frames) and the AVM image from the key postures extractor 210 and the AVM 215, respectively. In an example, a stream of the two-stream network 220 is a dynamic motion network (DMN) 225, and another stream is an accumulative motion network (AMN) 235. The key postures are fed into the DMN 225 to learn the spatiotemporal information in the sign gesture. The DMN 225 uses the main postures to learn spatiotemporal information pertaining to the sign language gesture. In the DMN 225, the extracted features are fed into a combination of a Convolutional Neural Network (CNN) and a Long Short-Term Memory (LSTM) network. The combination of the CNN and the LSTM network is configured to learn and extract the spatiotemporal information from the received key frame of the sign language gesture. The DMN 225 generates the dynamic motion features, as shown by 230 in FIG. 2. The AVM image is fed into the AMN 235. The AMN 235 is configured to learn the motion in the AVM image. The AMN 235 employs a CNN network that is fine-tuned on a pre-trained network. In an aspect, the AMN 235 utilizes an accumulated summation between the sign video stream frames and produces the RGB image representing the whole sign. The AMN 235 generates the accumulative motion features, as shown by 240.

The system 200 represents the motion of the sign in a single image (AVM image) using the AVM approach. The AMN 235 encodes spatial and temporal information. The AMN 235 also helps to recognize the static sign gestures that do not involve motion. The static signs gestures are a challenge for DMN 225 as the variations between some static signs are at the level of finger shapes, which cannot be captured easily by the DMN 225. The AMN 235 learns the signs represented by AVM. Each AVM image is fed into the AMN 235 that uses the CNN network fine-tuned on a pre-trained MobileNet network. The CNN network is used to extract 1024 features from each AVM image by applying global average pooling to an output of a layer before the classification layer of the MobileNet network. These features are fed into a dropout layer with 50% probability and the output of the dropout layer is fed into the classification layer.

The accumulative motion features and the dynamic motion features extracted from DMN 225 and AMN 235, respectively, are fused and fed into the SRN 245. These features are concatenated to form one vector which is used as an input to the SRN 245, as shown in FIG. 2.

Figure 3:
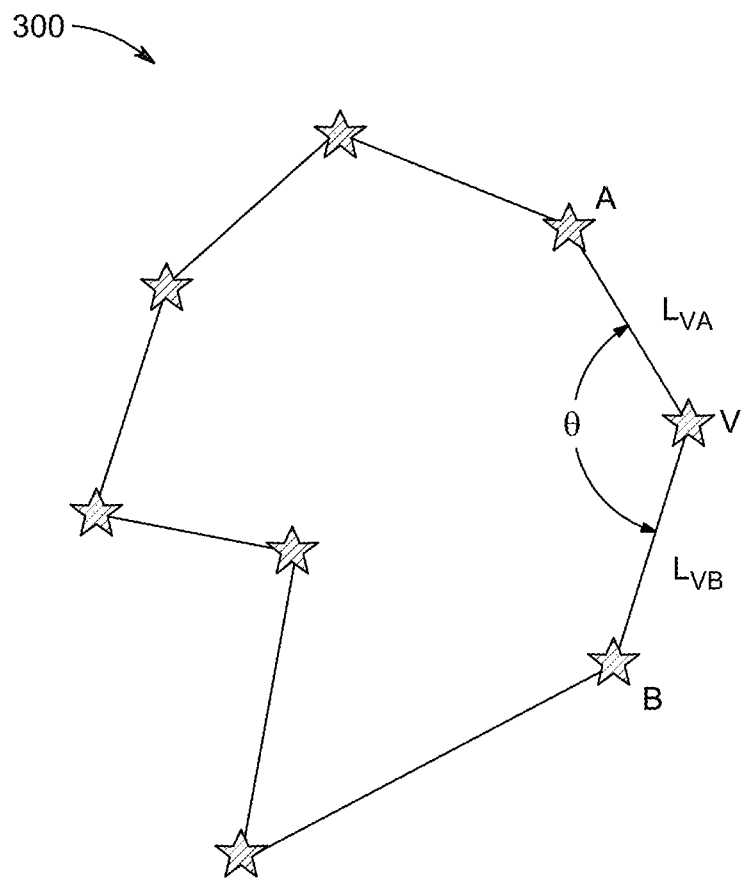
FIG. 3 is an illustration of connecting hand locations to form a polygon, according to certain embodiments.

FIG. 3 is an illustration of connecting hand locations to form a polygon 300, according to certain embodiments. FIG. 3 represents how hand locations are connected to form the polygon 300 to compute the importance of the vertices. In the system 100, a key posture technique is used to extract the main sign postures in the sign video stream by extracting the corresponding frames in the sign video stream. The key frames are extracted by employing the hand trajectories captured by tracking the hand joint points. The hand trajectories are returned by Kinect as part of the skeleton data. In an example, the Kinect is a line of motion sensing input devices, produced by Microsoft corporation located at 1 Microsoft Way, Redmond, WA 98052, USA. The Kinect contains RGB cameras, and infrared projectors and detectors that map depth through either structured light or time of flight calculations, which is used to perform real-time gesture recognition and body skeletal detection. In an example, the video dataset that was used for training and testing the system 100 was obtained using Kinect V2, a motion detection device for use with Microsoft Xbox. The points for the hand's joints may have some outliers that can significantly impact the extraction of key postures. To overcome, the joint points are preprocessed by employing smoothing of the hand locations using the median filter to remove the outliers in the hand trajectories. For occluded hands or lost joints, Kinect V2 is efficient in joint estimation. However, if this joint estimation is noisy or inaccurate, the median filter will smooth it in the preprocessing stage. Then, the key frames are extracted by connecting the hand locations during signing to form the polygon 300, as shown in FIG. 3.

The sharp changes in hand locations represent the vertices of the polygon (as shown by A and B). To keep the most important N vertices, a polygon approximation algorithm (reduction algorithm) was applied. The polygon approximation algorithm measures the importance of each vertex by taking the product of its edge's lengths and the angle between the edges of these vertices. As shown in FIG. 3, the importance of the vertex V is computed as follows:

$$V_{importance} = L_{AV} \times L_{VB} \times \theta \qquad (1)$$

where $L_{AV}$ and $L_{VB}$ are the lengths from the vertex V to the vertices A and B, respectively, whereas $\theta$ is the angle between the vertex V and the two adjacent segments. The reduction algorithm is applied to all polygonal vertices, and the least important vertex is removed. This reduction algorithm is iteratively repeated to recompute the importance of the remaining vertices until N vertices remain, as shown in FIG. 3.

Figure 4A:
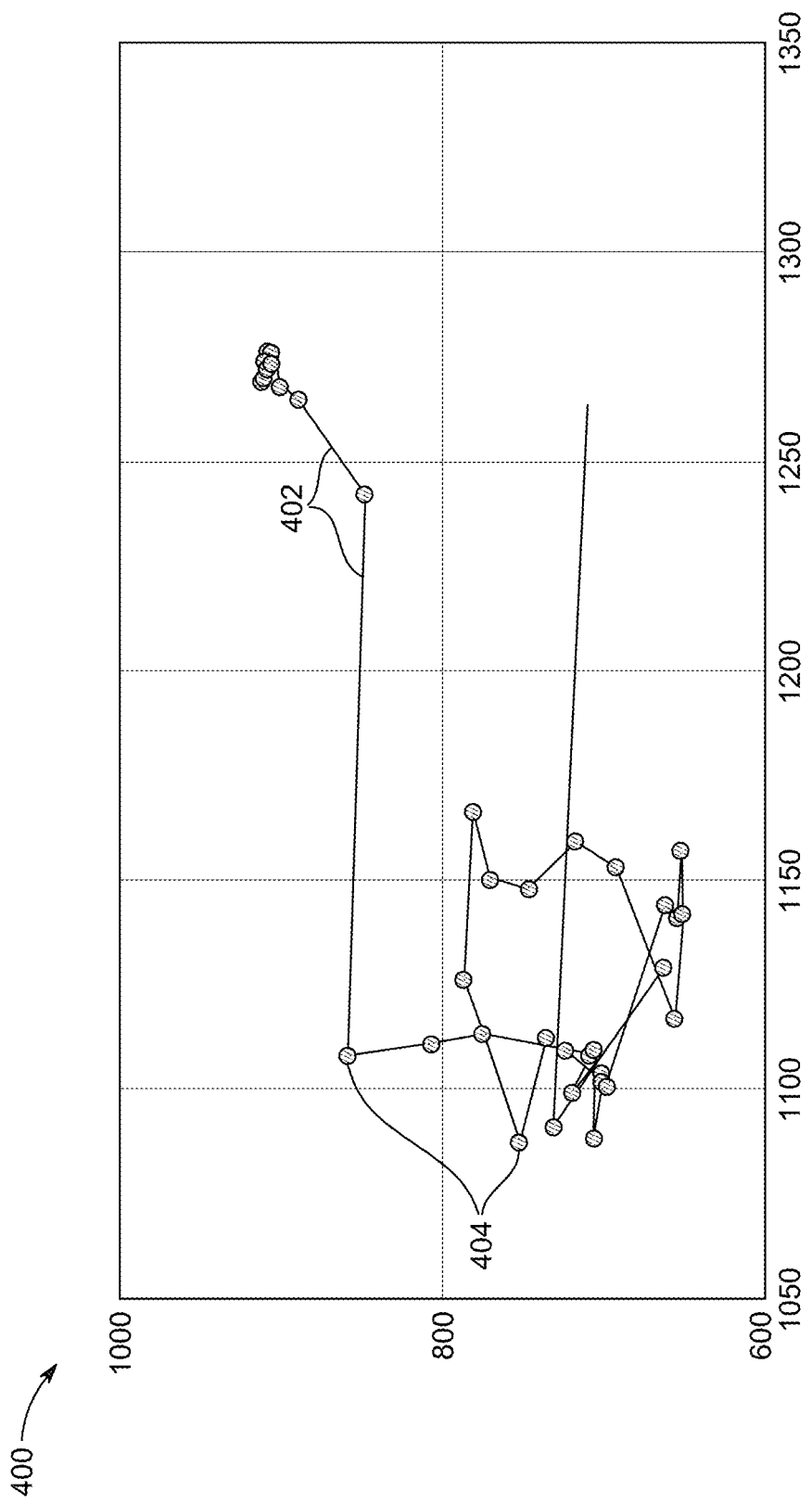
FIG. 4A is an exemplary representation of a raw hand trajectory for a "first aid" sign of Arabic sign language (ArSL), according to certain embodiments.
Figure 4B:
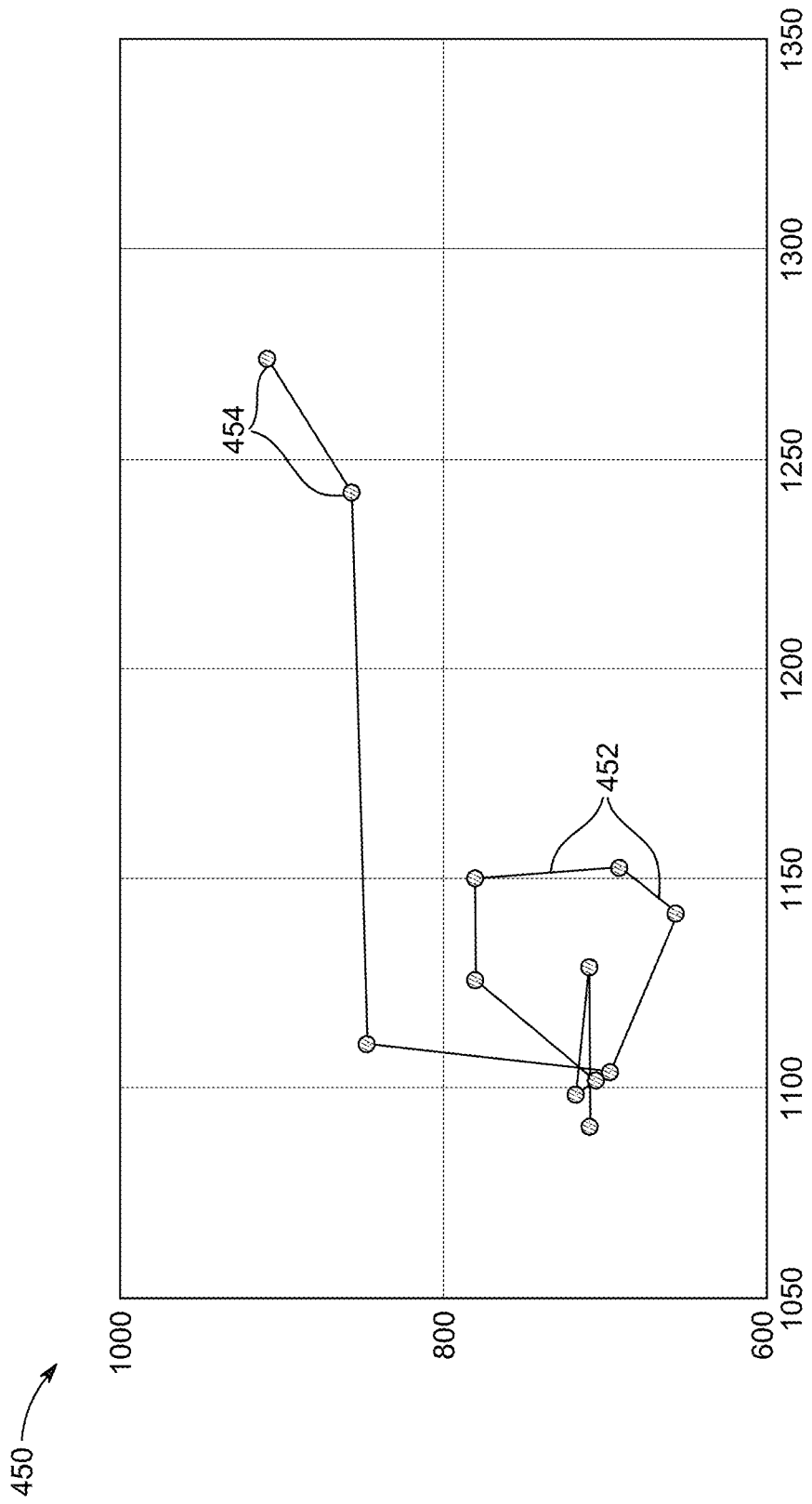
FIG. 4B is an exemplary representation of a trajectory for the "first aid" sign of ArSL, according to certain embodiments.

FIG. 4A-FIG. 4B show a raw hand trajectory and a trajectory obtained after applying a key postures algorithm. In an aspect, the key postures algorithm was applied to all the color videos to extract N key postures.

FIG. 4A is an exemplary representation 400 of a raw hand trajectory for a "first aid" sign of Arabic sign language (ArSL). Symbol 402 represents the raw hand trajectory captured by tracking the hand joint points. Symbol 404 represents the key frames extracted by connecting the hand locations.

FIG. 4B is an exemplary representation 450 of the trajectory corresponding to the "first aid" sign of ArSL. Symbol 452 represents the trajectory obtained after smoothing by applying the key postures algorithm. Symbol 454 represents the key frames generated by the key postures algorithm (in an example, performed by the key postures extractor).

Figure 5:
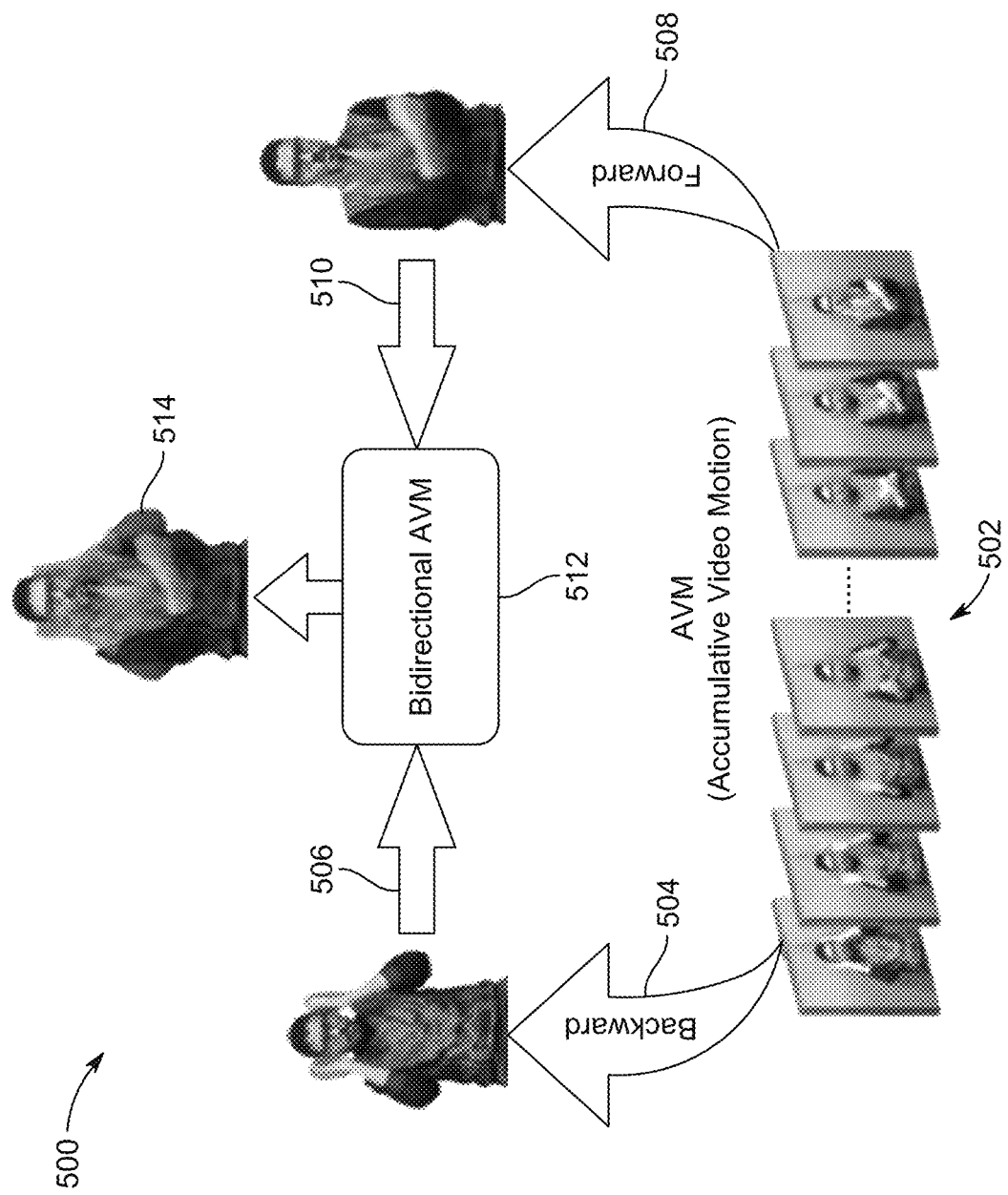
FIG. 5 is a schematic framework of an accumulative video motion (AVM) module, according to certain embodiments.

FIG. 5 is a schematic diagram of a framework of the AVM 500 module, according to certain embodiments. FIG. 5 shows a sample of the AVM image. Motion is a primary component of the dynamic sign gestures that represents a majority of the signs in the sign language dictionary. Encoding the motion into one still image (AVM image) helps in using spatial features extraction techniques to learn signs. Additionally, encoding helps overcome the problem of misclassifying static signs that do not include motion. The dynamic sign gestures differ based on the shapes and orientations of the hands and fingers. These variations cannot be captured easily by time-series techniques, such as the LSTM model. To overcome such problems, the system 100 employs the AVM technique that encodes the sign with its motion into the single image frame. The AVM module is based on a conventional accumulative temporal difference (ATD) technique. ATD represents the sign video as a single binary still image using the threshold accumulated difference between the consecutive frames. In the present system 100, the AVM module utilizes the accumulated summation between the sign's frames and produces the RGB image representing the whole sign. In addition, the present system 100 preserves the spatial information between the frames even if there is no motion in the sign. The conventional ATD technique preserves only the motion and removes the static features between the frames, which makes it inefficient for recognizing static gestures.

As shown in FIG. 5, the AVM 500 module receives the sign video stream frames as the input, shown as 502. The AVM 500 module is performed in three ways: backward AVM (504), forward AVM (508), and bidirectional AVM (512).

The AVM module creates a bidirectional composite image (Bi-AVM) by fusing the key frames in the forward direction and the backward direction, as follows:

$$Bi\text{-}AVM = \sum_{i=1}^{KP} KeyFrame_i + \sum_{i=KP}^{1} KeyFrame_i \qquad (2)$$

where KP is a number of key frames that correspond to the number of key postures. The forward AVM (FWD-AVM) 504 creates a composite image (as shown by 506) by fusing the images starting from the first frame till the last frame. The backward AVM (BWD-AVM) 508 starts the fusion in the reverse order from the last key frame till the first frame and generates a composite image (as shown by 510). The output of the forward AVM (FWD-AVM) 504 and the output of the backward AVM (BWD-AVM) 508 are fed into the bidirectional AVM 512 and generates the bidirectional composite image (Bi-AVM) 514.

Figure 6:
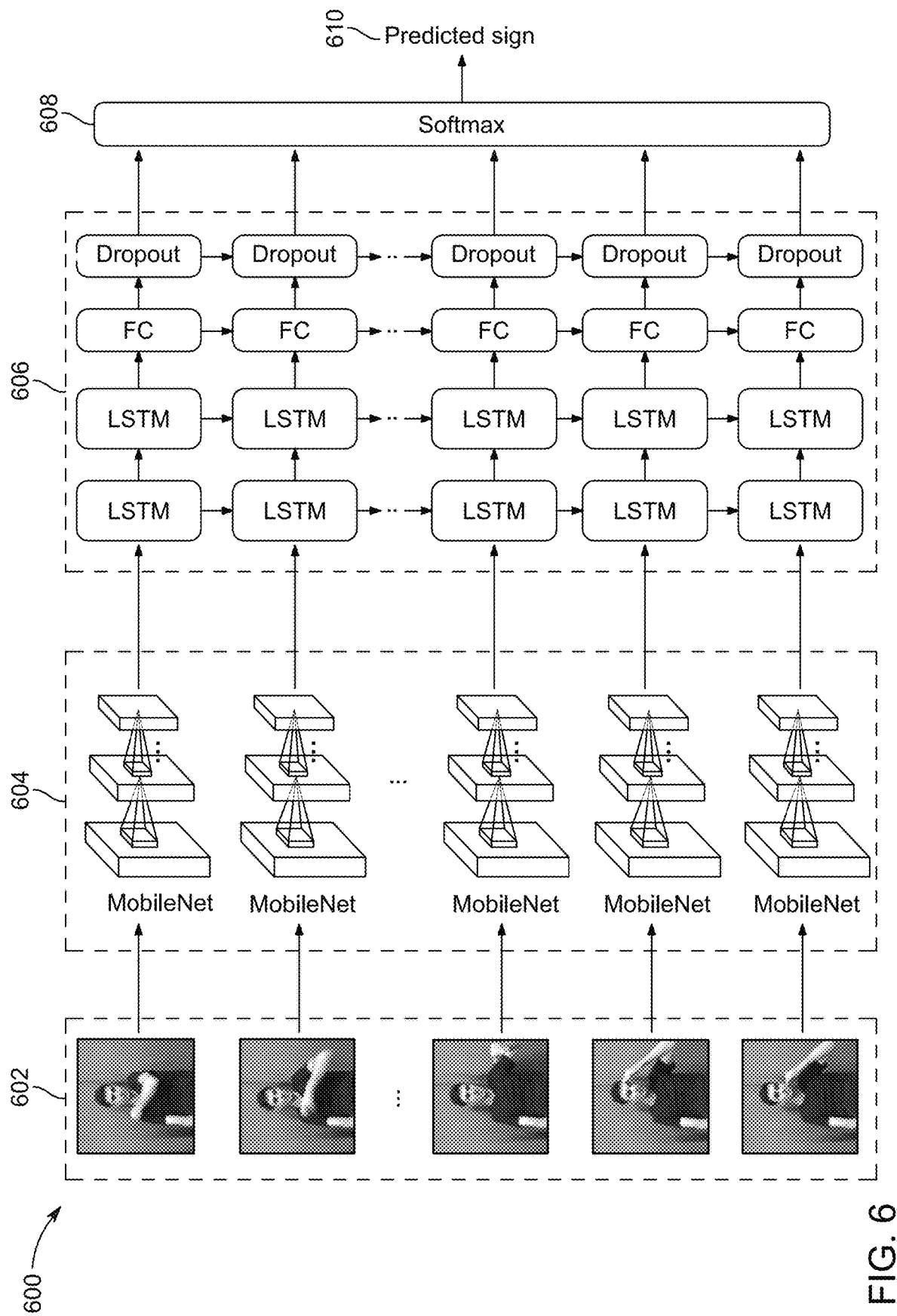
FIG. 6 is a schematic diagram of a framework of a dynamic motion network (DMN), according to certain embodiments.

FIG. 6 is a schematic diagram of a framework of the DMN 600, according to certain embodiments. The system 200 includes three networks for performing sign recognition as shown in FIG. 2. The first network, DMN, learns the spatiotemporal information on the key frames of the sign gesture. The AMN accepts the AVM image as an input to learn the spatial information of this image. The outputs of both DMN and AMN are fused at the features level and fed into the SRN model for learning and classification. As shown in FIG. 6, the framework of the DMN 600 includes an input layer 602 having a set of extracted key frames, a CNN-LSTM network 604, stacked LSTM 606, a classification layer 608, and an output layer 610.

Sign language recognition is a time-series problem that depends on two sources of information for each sign gesture: spatial and temporal. The spatial information represents the sign using fingers, hands, and body shapes and rotations. The temporal information represents the motion used by all the dynamic signs. Motion is a primary component in sign language, and it involves changing the position and/or shape of the hands during gesturing.

To learn and extract the spatial and temporal information from the key frame of the sign gesture, the CNN-LSTM network 604 is employed. CNN has been extensively employed for several pattern recognition problems, and its efficiency in extracting the spatial features is well established. The CNN network extracts the spatial features from the key frames. The CNN network is fine-tuned on a pre-trained network. In an example, the CNN is fine-tuned on four pre-trained models (viz., VGG16, Xception, ResNet152V2, and MobileNet) for extracting the spatial information from each key frame. These pre-trained models have been trained on ImageNet for large-scale image classification with 14,197,122 images and 21,841 subcategories. Although these pre-trained models have been trained on the same dataset, the specifications and structure of the models made them fit well for different pattern recognition problems.

As shown in FIG. 6, the extracted features using the pre-trained models are fed into the stacked LSTM 606. The stacked LSTM 606 includes two LSTM layers with 2048 neurons each. The output of these LSTM layers is fed into a fully connected (FC) layer with 1024 neurons followed by a rectified linear (ReLU) activation function. The activation function handles the nonlinearity by zeroing the negative values. The activation function is computationally powerful and helps to reduce the possibility of gradient vanishing. To reduce the overfitting, a dropout layer of 60% is used after the activation function. The classification layer 608 computes the cross-entropy loss for classification and weighted classification tasks with mutually exclusive classes. For classification, a Softmax layer is added as a last layer in the DMN to assign a probability value to each predicted sign. Therefore, the number of neurons in the classification layer 608 matches the number of signs in the dataset. In an example, the cross-entropy loss function was used during the model training. The output layer 610 is configured to output the predicted sign to be fed into the SRN.

In one embodiment, the SRN is a convolutional network that includes four stacked layers. A first layer is a batch normalization layer that is used to normalize the input features, inputted to the first layer and consequently reduce the model training time. In addition, the first layer helps in addressing the internal covariate shift problem that results from the distribution change of the network activations during the model training. The output of the batch normalization layer is fed into a convolutional layer (second layer). The convolutional layer (second layer) utilizes 256 neurons for learning having a kernel size of seven (7). To supervise the nonlinearity of the features extracted using the convolutional layer, a Rectified Linear Unit (ReLU) activation (also known as ReLU activation function) is employed. According to the ReLU activation function, the function output is rectified for negative inputs. The input may be flattened to be given as input to the fully connected layer. In an example, the ReLU activation function is used at each of the convolutional layers.

The resulting output of the convolutional layer is fed into a dropout layer (third layer) with a probability of 60% selected empirically. The third layer helps in reducing the possibility of overfitting. A fourth layer is a classification layer that uses a Softmax classifier with the number of neurons equal to the number of signs. The recognition model is trained with a cross-entropy loss function and an Adam optimizer with a learning rate of $10^{-4}$, which was selected empirically. In an aspect, the Adam optimizer performs adaptive moment estimation. The Adam optimizer is an algorithm for optimization technique for gradient descent.

EXAMPLES AND EXPERIMENTS

The following examples are provided to illustrate further and to facilitate the understanding of the present disclosure.

During experiments, the system 100 can be evaluated using two datasets, namely, KArSL (Arabic sign language dataset) and LSA64 (Argentinian sign language dataset), respectively. KArSL is a multimodality dataset. ArSL dataset is recorded using Kinect V2 at a rate of 30 frames per second. The KArSL dataset includes 502 signs performed by three signers, and each sign is repeated 50 times by each signer; finally, a total of 75,300 samples. Each sign was available in three modalities: RGB, depth, and skeleton joint points. The joint points are employed to extract the key postures of the sign gestures and are used the corresponding frames in the video stream as the input to the key postures extractor, AVM, and SRN. The dataset had different types of sign gestures, which included digits and numbers (30 signs), letters (39 signs), and sign words (433 sign words). All of these signs are available in RGB video format. For alphabet letters and digits, the KArSL dataset includes more signs representing the combination between some letters or digits of the ArSL dataset, such as Alif letter with Hamza, 10, 100, and 200 signs.

Figure 7A:
FIG. 7A is an illustration of samples from the KArSL dataset, according to certain embodiments.
Figure 7A:
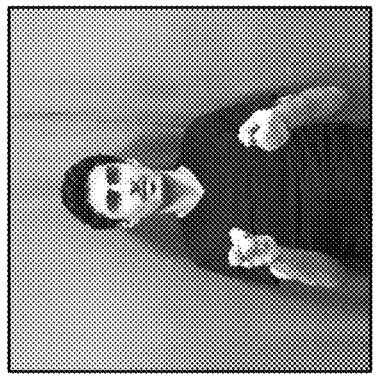
Figure 7A:
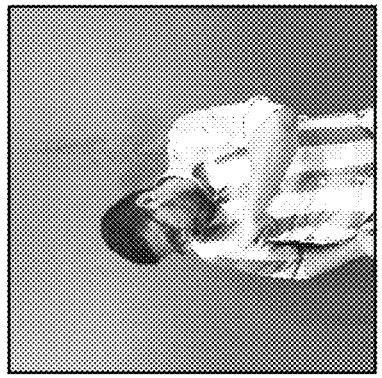

FIG. 7A is an illustration of a few samples 700 from the KArSL dataset, according to certain embodiments. During experiments, two sets of the KArSL dataset can be used: the KArSL-190 dataset and the KArSL-502 dataset. The KArSL-190 dataset is a pilot version of the KArSL dataset. The KArSL-190 dataset includes 190 signs with 30 digit signs, 39 letter signs, and 121 word signs. The KArSL-190 dataset was used to evaluate the present system 100 and compare the system 100 with other conventional systems that used the KArSL-190 dataset. Further, the system 100 was also evaluated on more signs using the KArSL-502 dataset, which includes all the signs (502 signs) of the KArSL dataset. The results shown for the KArSL-502 dataset can also be used to benchmark the KArSL dataset because the present system uses the whole KArSL dataset.

Figure 7B:
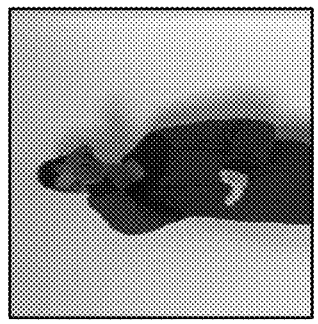
FIG. 7B is an illustration of samples from the LSA64 dataset, according to certain embodiments.
Figure 7B:
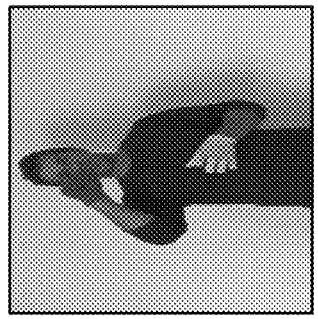
Figure 7B:
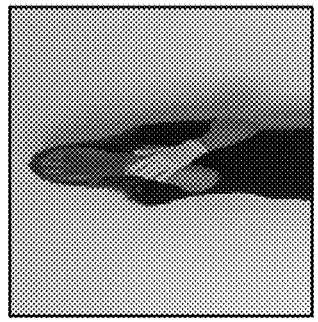
Figure 7B:
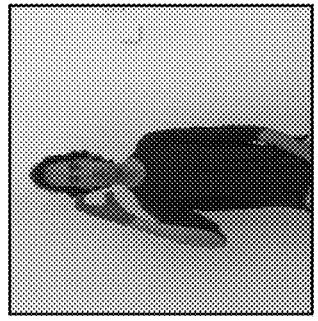
Figure 7B:
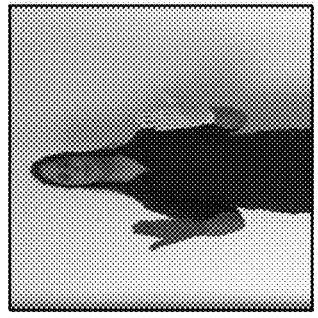

FIG. 7B is an illustration of a few samples 750 from the used LSA64 dataset, according to certain embodiments. LSA64 dataset contains 3200 videos of 64 signs performed by ten signers. Each sign is repeated five times by each signer. The dataset was collected using an RGB color camera. The signers who performed the dataset signs wore colored gloves to ease the detection and tracking of their hands. However, during experiments the signs without performing any segmentation were used.

Figure 8:
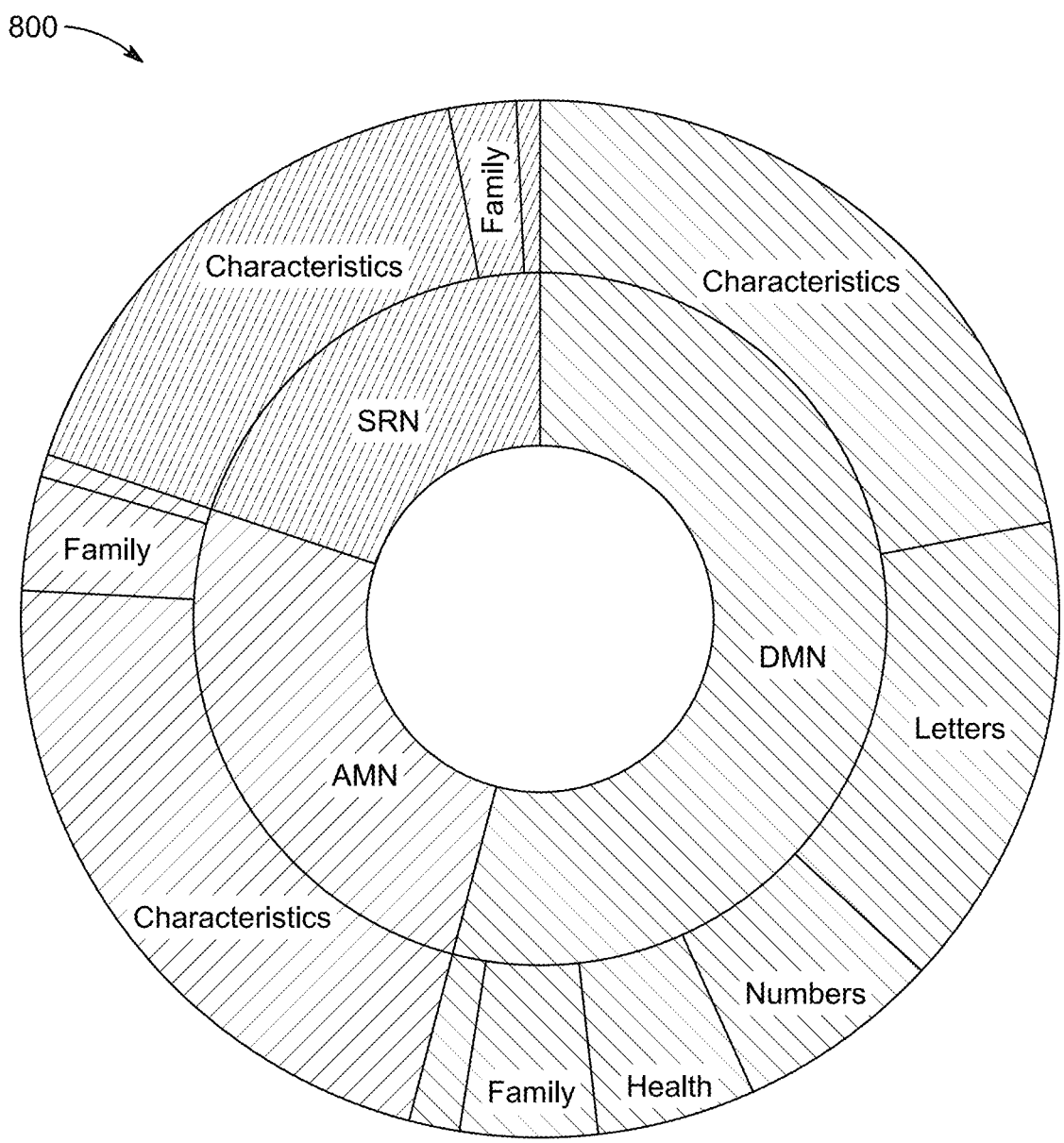
FIG. 8 is an exemplary representation of misclassified signs by each network on KArSL-502 dataset, according to certain embodiments.

First Experiment: Determining the Signs Misclassified by Each Network on KArSL-502 Dataset The first experiment was carried out for determining the misclassified signs by each network on KArSL-502 dataset. FIG. 8 is an exemplary representation 800 of the misclassified signs by each network (SRN, AMN, DMN) on KArSL-502 dataset, according to certain embodiments. To better investigate the misclassifications, a pie chart 800 (as shown in FIG. 8) was used that represents the misclassification signs of KArSL-502 for each network. The signs involved in the first experiment are those that could not be recognized by the network in the signer-independent mode for the three signers. FIG. 8 also shows how the AMN is able to recognize almost all the static signs, unlike the DMN. As shown in FIG. 8, most of the signs that could not be recognized by all the network belong to the characteristics signs such as happy, poor, and selfish.

Figure 9A:
FIG. 9A is an illustration of sign of "afraid" having same manual gestures, according to certain embodiments.
Figure 9B:
FIG. 9B is an illustration of sign of "stand" having same manual gestures, according to certain embodiments.

FIG. 9A-FIG. 9B show how the "afraid" and "stand" signs of ArSL share the same gesture and motion but are accompanied by different facial expressions. Most of the characteristics signs have identical manual gestures and differ only in the facial expressions as shown in FIG. 9A-FIG. 9B. FIG. 9A is an illustration 900 of sign of "afraid" having same manual gestures. FIG. 9B is an illustration 950 of sign of "stand" having same manual gestures.

Several experiments can be conducted with different configurations to evaluate the efficiency of the system 100. Experiments can be conducted in two modes: a signer dependent mode, and a signer independent mode. In the signer-dependent mode, the system 100 was tested on samples of the signers who were involved in the training of the model. In the signer-independent mode, the system 100 was tested on the signs performed by the signers who were not present for the model training. For the signer-dependent mode, four sets of experiments can be performed on the KArSL dataset—three sets corresponding to each of the three signers in the KArSL dataset, and one set contained the signs of all the signers. For the signer-independent mode, three sets corresponding to each signer can be tested for the dataset. For example, in the set used for signer 01 in the signer-independent mode, two signers (signer 02 and signer 03) are used for training, and one signer (signer 01) is used for testing.

In the experiments, each component of the system 100 was evaluated independently. The DMN was evaluated using different pre-trained networks on 18 key postures selected empirically. The CNN component of the DMN was fine-tuned using four pre-trained models for sign recognition, namely, VGG16, Xception, ResNet152 and MobileNet. The feature vectors resulting from these pre-trained models are fed into the stacked LSTM, as shown in FIG. 6. Then, the AMN was evaluated using three configurations: forward (FWD-AMN), backward (BWD-AMN), and bidirectional (BWD-AMN). The AMN accepts the AVM image as an input and employs a pre-trained MobileNet network for features extraction, as shown in FIG. 5. Finally, the SRN was evaluated that accepts the dynamic and accumulative motion features extracted from the DMN and AMN, respectively. All these experiments are performed using Tensorflow 2.5 on a workstation with Nvidia Geforce RTX 2080TI graphics processing unit (GPU) with 11 GB GPU memory and 64 GB RAM memory. The TensorFlow 2.5 is a free and open-source software library for machine learning and artificial intelligence.

The DMN includes the stacked LSTM layers as shown in FIG. 6. The LSTM component of the DMN has been selected empirically as shown in Table I.

The table I shows the recognition accuracies of the DMN with LSTM and GRU (Gated Recurrent Unit) components using different pre-trained models on KArSL-502 dataset. The DMN with LSTM and MobileNet model outperformed the other pre-trained models. Therefore, all other experiments are conducted using the DMN with LSTM and MobileNet pre-trained model.

TABLE I

| | | Recognition accuracies of the DMN on KArSL-502 | | | | | | | |
|---|---|---|---|---|---|---|---|---|---|
| | | Signer-dependent | | | | Signer-independent | | | |
| | Model | Signer 1 | Signer 2 | Signer 3 | All | Signer 1 | Signer 2 | Signer 3 | Average |
| LSTM | DMN-VGG16 | 0.973 | 0.984 | 0.992 | 0.985 | 0.253 | 0.156 | 0.217 | 0.209 |
| | DMN-Xception | 0.976 | 0.991 | 0.99 | 0.986 | 0.198 | 0.139 | 0.141 | 0.159 |
| | DMN-ResNet152 | 0.981 | 0.995 | 0.996 | 0.988 | 0.229 | 0.15 | 0.207 | 0.195 |
| | DMN-MobileNet | 0.981 | 0.994 | 0.996 | 0.993 | 0.267 | 0.194 | 0.236 | 0.232 |
| GRU | DMN-VGG16 | 0.981 | 0.996 | 0.997 | 0.982 | 0.224 | 0.158 | 0.212 | 0.198 |
| | DMN-Xception | 0.982 | 0.997 | 0.999 | 0.991 | 0.239 | 0.148 | 0.154 | 0.180 |

TABLE I-continued

Recognition accuracies of the DMN on KArSL-502

| | Signer-dependent | | | | Signer-independent | | | |
|---|---|---|---|---|---|---|---|---|
| Model | Signer 1 | Signer 2 | Signer 3 | All | Signer 1 | Signer 2 | Signer 3 | Average |
| DMN-ResNet152 | 0.981 | 0.993 | 0.997 | 0.988 | 0.257 | 0.164 | 0.243 | 0.221 |
| DMN-MobileNet | 0.985 | 0.992 | 0.998 | 0.992 | 0.228 | 0.151 | 0.216 | 0.180 |

Table II shows the obtained results for the models (SRN, DMN, AMN) in the signer-dependent mode using KArSL-190 and KArSL-502 datasets. As evident from table II, the AMN with all the fusion configurations outperformed the DMN, therefore the AMN is able to capture the static sign gestures with minor differences encoded by the AVM technique. The highest accuracies of AMN fusions are obtained with bidirectional AMN (Bi-AMN) that considers fusion in both directions. The features extracted using DMN with MobileNet are fused with the features extracted using AMN to form the input for the SRN. The DMN with MobileNet was selected because it performed better than other pre-trained models. The fusion with forward, backward, and bidirectional AMNs, which are shown in Table II as FWD-SRN, BWD-SRN, and Bi-SRN, respectively, was also evaluated. Table II also shows that the obtained accuracies using the SRN network outperformed the DMN for the KArSL-190 and KArSL-502 datasets. The obtained results with SRN are high in the signer-dependent mode.

TABLE II

Signer-dependent recognition results on KArSL-190 and KArSL-502

| | KArSL-190 | | | | KArSL-502 | | | |
|---|---|---|---|---|---|---|---|---|
| Model | Signer 01 | Signer 02 | Signer 03 | All | Signer 01 | Signer 02 | Signer 03 | All |
| DMN-MobileNet | 0.967 | 0.993 | 0.997 | 0.981 | 0.981 | 0.994 | 0.996 | 0.993 |
| FWD-AMN | 0.974 | 0.995 | 0.999 | 0.991 | 0.993 | 0.998 | 0.999 | 0.995 |
| BWD-AMN | 0.978 | 0.997 | 0.998 | 0.988 | 0.990 | 0.997 | 0.999 | 0.992 |
| Bi-AMN | 0.980 | 1.000 | 0.997 | 0.991 | 0.991 | 0.998 | 0.999 | 0.996 |
| FWD-SRN | 0.979 | 0.990 | 0.993 | 0.984 | 0.991 | 0.989 | 0.988 | 0.990 |
| BWD-SRN | 0.974 | 0.988 | 0.985 | 0.985 | 0.996 | 0.987 | 0.996 | 0.980 |
| Bi-SRN | 0.971 | 0.992 | 0.993 | 0.990 | 0.991 | 0.990 | 0.996 | 0.988 |

Although the results obtained for the models (SRN, DMN, AMN) with the signer-dependent mode can be considered satisfactory, the more challenging type of sign language recognition is with the signer-independent mode. The signer-independent mode recognition is related to the real-time systems that are tested on signers who are different from the signers involved in system training. For experiments, two signers from the KArSL dataset are used for training, and a third signer was used for testing. Table III shows the signer-independent mode recognition rates.

TABLE III

Signer-independent recognition rates

| | KArSL-190 | | | | KArSL-502 | | | |
|---|---|---|---|---|---|---|---|---|
| Model | Signer 01 | Signer 02 | Signer 03 | Average | Signer 01 | Signer 02 | Signer 03 | Average |
| DMN-MobileNet | 0.167 | 0.166 | 0.183 | 0.172 | 0.267 | 0.194 | 0.236 | 0.232 |
| FWD-AMN | 0.368 | 0.343 | 0.180 | 0.297 | 0.394 | 0.285 | 0.179 | 0.286 |
| BWD-AMN | 0.333 | 0.294 | 0.300 | 0.309 | 0.289 | 0.228 | 0.252 | 0.256 |
| Bi-AMN | 0.408 | 0.329 | 0.413 | 0.383 | 0.390 | 0.295 | 0.343 | 0.343 |
| FWD-SRN | 0.334 | 0.330 | 0.390 | 0.351 | 0.352 | 0.298 | 0.326 | 0.325 |

TABLE III-continued

Signer-independent recognition rates

| | KArSL-190 | | | | KArSL-502 | | | |
|---|---|---|---|---|---|---|---|---|
| Model | Signer 01 | Signer 02 | Signer 03 | Average | Signer 01 | Signer 02 | Signer 03 | Average |
| BWD-SRN | 0.307 | 0.356 | 0.336 | 0.333 | 0.258 | 0.230 | 0.213 | 0.234 |
| Bi-SRN | 0.363 | 0.423 | 0.419 | 0.402 | 0.358 | 0.269 | 0.355 | 0.327 |

Comparison of table II and table III shows that the signer-independent recognition was more challenging than the signer-dependent recognition. It is clear from table III that the accuracies of all the configurations of the AMN on both datasets are significantly higher than the accuracies of the configurations of the DMN. The AMN fusions with the bidirectional AMN are significant. Fusing the AMN with DMN-MobileNet and feeding them into the SRN helped to improve the results on KArSL-190 for all the signers. For KArSL-502, the fusion of DMN and AMN improved the accuracy of all the signers as compared with FWD-AMN and BWD-AMN. However, the accuracy of only Signer 03 improved with Bi-SRN as compared with Bi-AMN.

Also, the performance of the system 100 on each sign category was evaluated as shown in table IV. Table IV shows the recognition accuracies of each network separately on the three categories of KArSL signs (numbers, letters, and sign words) in the signer-independent mode.

TABLE IV

Recognition accuracies of the present system 100 per sign category in the signer-independent mode.

| | | KArSL-190 | | | KArSL-502 | | |
|---|---|---|---|---|---|---|---|
| Signer | Signs | DMN | Bi-AMN | Bi-SRN | DMN | Bi-AMN | Bi-SRN |
| Signer 01 | Numbers | 0.062 | 0.383 | 0.174 | 0.118 | 0.351 | 0.225 |
| | Letters | 0.092 | 0.447 | 0.415 | 0.086 | 0.436 | 0.415 |
| | Sign words | 0.223 | 0.428 | 0.395 | 0.296 | 0.359 | 0.363 |
| | Average | 0.126 | 0.420 | 0.328 | 0.167 | 0.382 | 0.334 |
| Signer 02 | Numbers | 0.033 | 0.143 | 0.297 | 0.104 | 0.196 | 0.166 |
| | Letters | 0.095 | 0.338 | 0.461 | 0.041 | 0.434 | 0.360 |
| | Sign words | 0.222 | 0.373 | 0.442 | 0.214 | 0.301 | 0.268 |
| | Average | 0.117 | 0.285 | 0.400 | 0.119 | 0.310 | 0.265 |
| Signer 03 | Numbers | 0.024 | 0.202 | 0.409 | 0.046 | 0.146 | 0.163 |
| | Letters | 0.038 | 0.405 | 0.462 | 0.007 | 0.359 | 0.408 |
| | Sign words | 0.275 | 0.468 | 0.412 | 0.272 | 0.336 | 0.334 |
| | Average | 0.112 | 0.358 | 0.428 | 0.108 | 0.281 | 0.302 |

The accuracies shown in table IV are for the bidirectional AMN and DMN with the MobileNet pre-trained model because both models outperformed other settings. Table IV also shows that for all the models, the signs of type number are the most challenging to recognize, followed by the letters signs. This can be attributed to the lack of motion in these signs. In addition, most of these signs are static and the differences between some of these static signs are marginal. For example, ArSL letters such as 'Da~t' and 'Sa~d' are almost similar and differ only on the position of the thumb finger. Additionally, certain number signs have only marginal variations, which cannot be captured easily with the recognition models. In contrast, the highest recognition rates are obtained with sign words, that can be attributed to the variation between sign words and the use of motion with these signs. It is also noticeable in the confusion matrix that the AMN can recognize the static signs more efficiently than the DMN due to its ability to capture the spatial features encoded by the AVM technique. The fusion of the DMN and AMN through the SRN improved the accuracies of all sign types for all signers except Signer 01 of KArSL-190. Furthermore, the SRN outperformed DMN with all sign types of KArSL-502.

To evaluate the efficiency of the present system 100, the obtained results with the state-of-the-art techniques in the literature for the two datasets KArSL-190 and LSA64 is compared. Generally, four techniques can be used for ArSL recognition. Three types of features are extracted from the skeleton's joint points provided by the Kinect sensor and fed into the HMM: (i) the joint points of the signers' hands, (ii) the hand shape represented using HOG, and (iii) a combination of joint points and the shapes of the signers' hands. Additionally, the conventional systems formed a single image from all the frames of the signs and used a CNN model with VGG-19 for classification. Table V compares the results of these techniques with the results of the present system 100 using KArSL-190. As shown in the table V, the obtained results of the present AMN and SRN in the signer-dependent and signer-independent modes outperformed other techniques. In addition, the improvements in accuracy over the results of the conventional system with Bi-SRN are approximately 11% and 15% in the signer-dependent and signer-independent modes, respectively. These results confirm the efficiency of the system (networks for sign recognition).

TABLE V

Comparison with other works using KArSL-190

| Model | Signer-dependent Average | Signer-independent | | | |
|---|---|---|---|---|---|
| | | Signer 01 | Signer 02 | Signer 03 | Average |
| Joint points + HMM | 0.843 | 0.160 | 0.080 | 0.117 | 0.119 |
| HOG + HMM | 0.881 | 0.190 | 0.150 | 0.177 | 0.172 |
| Joint points + HOG + HMM | 0.853 | 0.156 | 0.080 | 0.116 | 0.117 |
| VGG-19 | 0.76 | 0.280 | 0.267 | 0.222 | 0.256 |
| DMN-MobileNet | 0.985 | 0.167 | 0.166 | 0.183 | 0.172 |
| FWD-AMN | 0.990 | 0.368 | 0.343 | 0.180 | 0.297 |
| BWD-AMN | 0.990 | 0.333 | 0.294 | 0.300 | 0.309 |
| Bi-AMN | 0.992 | 0.408 | 0.329 | 0.413 | 0.383 |
| FWD-SRN | 0.988 | 0.334 | 0.330 | 0.390 | 0.351 |
| BWD-SRN | 0.985 | 0.307 | 0.356 | 0.336 | 0.333 |
| Bi-SRN | 0.987 | 0.363 | 0.423 | 0.419 | 0.406 |

The LSA64 dataset, which is an Argentinian dataset having 64 signs performed by ten signers, was also used to evaluate the generalization of the system 100 to other sign languages. The system 100 can be evaluated in the signer-dependent and signer-independent modes. For the signer-dependent mode, the data is randomly split into training data (80%) and a testing data (20%) sets. For example, each experiment is repeated five times. For the signer-independent mode, nine signers are used for model training, and the 10th signer was used as an unseen signer for testing. The results of the system can be compared with the results obtained by various conventional systems. The comparative results are presented in Table VI.

TABLE VI

Comparison with other works using LSA64 dataset

| Model | Signer-dependent | Signer-independent |
|---|---|---|
| 3D CNN | 0.939 | — |
| Skeletal features + LSTM | 0.981 | — |
| Statistical features + Multiclassifiers | 0.974 | 0.917 |
| CNN-LSTM | 0.952* | — |
| ConvNet | 0.978 | — |
| CSD + SVM | — | 0.850 |
| DMN-MobileNet | 0.991 | 0.258 |
| FWD-AMN | 0.976 | 0.858 |
| BWD-AMN | 0.968 | 0.848 |
| Bi-AMN | 0.985 | 0.918 |
| FWD-SRN | 0.949 | 0.818 |
| BWD-SRN | 0.964 | 0.784 |
| Bi-SRN | 0.975 | 0.885 |

The present system outperformed other conventional systems in the signer-dependent and signer-independent experiments. The highest accuracy in the signer-independent mode was obtained using Bi-AMN. In this experiment, the lowest accuracies are obtained with signer 02, signer 03, and signer 08 (see Table VII). These signers are nonexpert signers, and they introduced certain movements that are not part of the sign language, such as head motions and returning hands to their resting positions before signing.

TABLE VII

Signer-independent recognition accuracies of the bidirectional AMN on the LSA64 dataset.

| Signer | 01 | 02 | 03 | 04 | 05 | 06 | 07 | 08 | 09 | 10 | Average |
|---|---|---|---|---|---|---|---|---|---|---|---|
| Accuracy | 0.947 | 0.906 | 0.834 | 0.966 | 0.919 | 0.931 | 0.938 | 0.897 | 0.934 | 0.913 | 0.918 |

Figure 10:
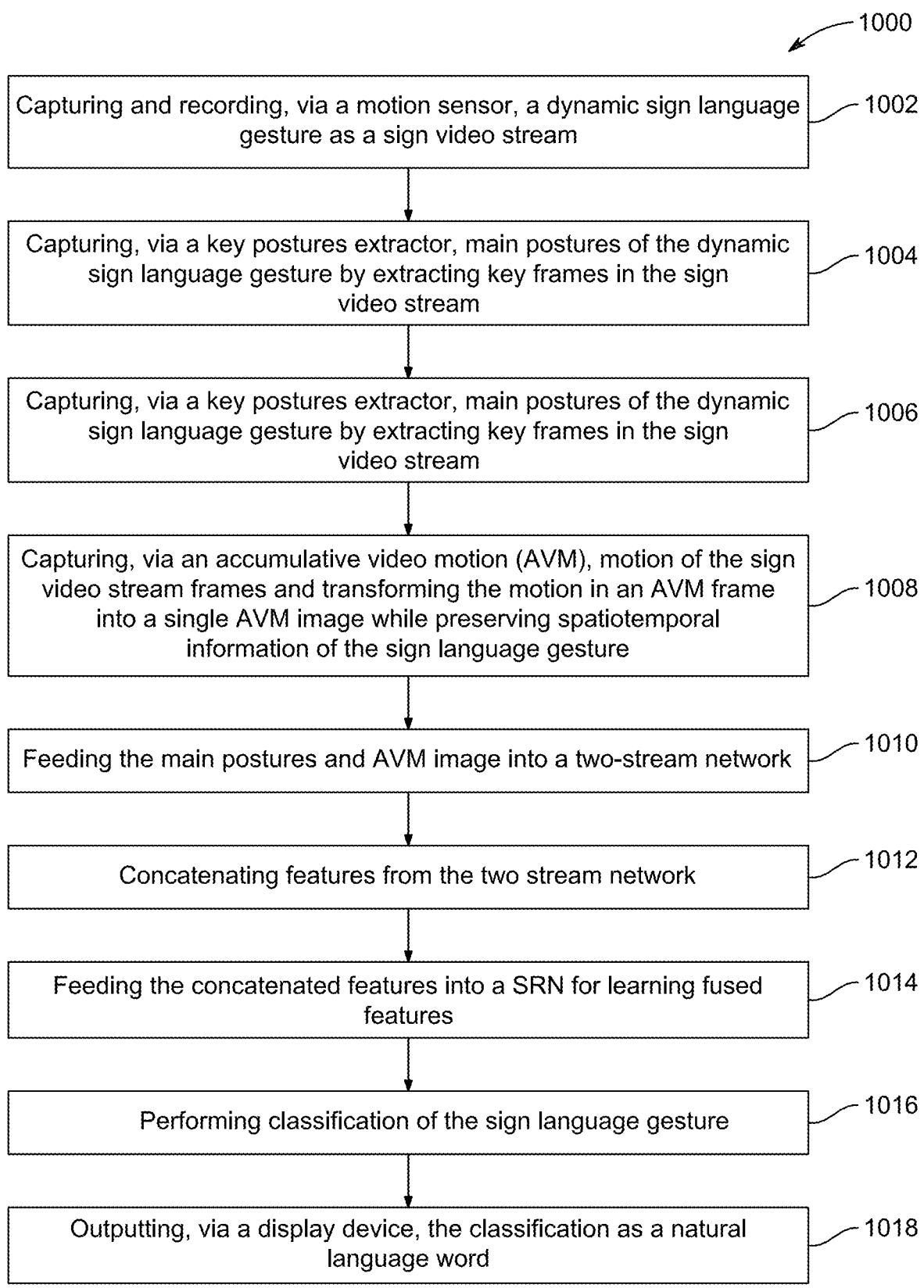
FIG. 10 is a schematic flow chart of a method of recognizing sign language, according to certain embodiments.

FIG. 10 illustrates a method 1000 of recognizing sign language, according to certain embodiments.

At step 1002, the method 1000 includes capturing and recording, via a motion sensor 105, a dynamic sign language gesture as a sign video stream.

At step 1004, the method 1000 includes capturing, via a key postures extractor 115, main postures of the dynamic sign language gesture by extracting key frames in the sign video stream. In one embodiment, the method 1000 further includes a step of extracting the key frames, via the key postures extractor 115, by employing hand trajectories captured by tracking hand joint points. In an aspect, the key postures extractor 115 further performs a step of preprocessing the joint points by smoothing hand locations using a median filter to remove outlier joint points. In an aspect, the key postures extractor 115 further performs a step of extracting the key frames by connecting the hand locations during the signing to form a polygon, wherein sharp changes in hand locations are represented as vertices of the polygon. In an aspect, the key postures extractor 115 further perform a step of iteratively repeating a reduction algorithm to recompute importance of remaining vertices until N vertices remain in the polygon to obtain a reduced trajectory.

At step 1006, the method 1000 includes capturing, via an accumulative video motion (AVM), motion of the sign video stream frames and transforming the motion in an AVM frame into a single AVM image while preserving spatiotemporal information of the sign language gesture.

At step 1008, the method 1000 includes feeding the main postures and AVM image into a two-stream network 130.

At step 1010, the method 1000 includes concatenating features from the two stream network.

At step 1012, the method 1000 includes feeding the concatenated features into a SRN for learning fused features.

At step 1014, the method 1000 includes performing classification of the sign language gesture.

At step 1016, the method 1000 includes outputting, via a display device 140, the classification as a natural language word.

In an aspect, the method 1000 further includes a step of learning, via a dynamic motion network (DMN), spatiotemporal information pertaining to the sign language gesture.

In an aspect, the method 1000 further includes, in the DMN, feeding the extracted features into a combination of Convolutional Neural Network (CNN) and Long Short-Term Memory (LSTM) network to learn and extract the spatiotemporal information from the key frame of the sign language gesture.

In an aspect, the method 1000 further includes a step of comprising learning, via an accumulative motion network (AMN), the motion in the AVM image.

In an aspect, the method 1000 further includes a step of feeding the AVM image into the AMN that uses a convolutional neural network (CNN) network fine-tuned on a pre-trained network.

In an aspect, the method 1000 further includes a step of computing an accumulated summation between the sign video stream frames. The AMN utilizes the accumulated summation between the sign video stream frames and producing an RGB image representing the whole sign.

In an aspect, the method 1000 further includes a step of preserving the spatiotemporal information of the sign by fusing the sign's key postures in forward and backward directions to generate the AVM image.

The present disclosure discloses an isolated sign language recognition system that includes three deep learning models (DMN, AMN, and SRN) for sign language recognition. The DMN learns the spatiotemporal information of the sign's key postures. The key postures are extracted for handling the variations between the sign's samples. The system uses the dominant postures that represent the key motion changes of the sign. The AVM approach encodes the sign motion into a single image. This single image was used as the input for the AMN. The SRN fuses the features extracted from the DMN and AMN and uses them as input. These networks are evaluated on two datasets, and the results proved that the AMN is efficient for sign language recognition compared to other networks and outperformed the conventional systems. Signer-independent recognition is more challenging than signer-dependent recognition, and the number of signers used for model training plays a vital role in the model's accuracy. The models are trained on a large number of signers, therefore having higher signer-independent accuracy than those trained on a small number of signers.

Figure 11:
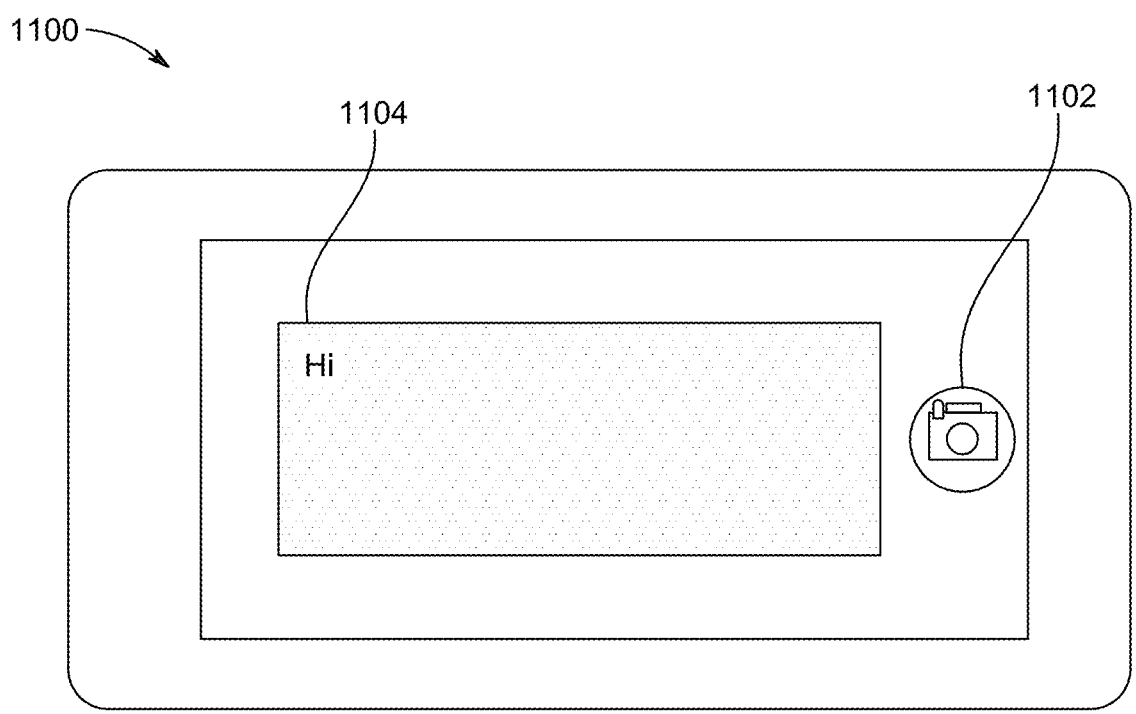
FIG. 11 is an exemplary illustration of a handheld device for sign language recognition, according to certain embodiments.

FIG. 11 is an exemplary illustration of a handheld device 1100 for sign language recognition, according to certain embodiments. In an aspect, the sign language recognition system 100 may be implemented in the handheld device 1100 or in a user computing device. The user computing device may be any device, such as a desktop computer, a laptop, a tablet computer, a smartphone, a camera, a mobile device, a stand-alone sign language recognition device, or a Personal Digital Assistant (PDA).

As shown in FIG. 11, the handheld device 1100 includes a camera 1102, and a display 1104. The camera 1102 is configured to capture a sign language video stream. The display 1104 is configured to display the natural language word(s) that correspond to the sign language.

In an aspect, the device 1100 is a special-purpose device, which is configured to provide an interactive service to a user to recognize the sign language. The device 1100 may detect the sign activities of the user, and interact with the user by providing interactive services. In one aspect, the sign language recognition may be implemented using the user computing device through a sign language recognition application installed therefor. In some examples, the sign language recognition application may be a software or a mobile application from an application distribution platform. Examples of application distribution platforms include the App Store for iOS provided by Apple, Inc., Play Store for Android OS provided by Google Inc., and such application distribution platforms.

Summarizing, the system 100 has at least following features:
1. employing a trainable deep learning network for sign language recognition that can effectively capture the spatiotemporal information with few frames of the signs;
2. employing a hierarchical sign learning model, which learns the spatial and temporal information of the sign gesture using three networks: dynamic motion network (DMN), accumulative motion network (AMN), and sign recognition network (SRN);
3. extracting the dominant and important sign postures, helping to handle the variations of the sign samples; and
4. employing the accumulative video motion (AVM) technique to encode the sign motions in the video stream and converting into a single image.

Figure 12:
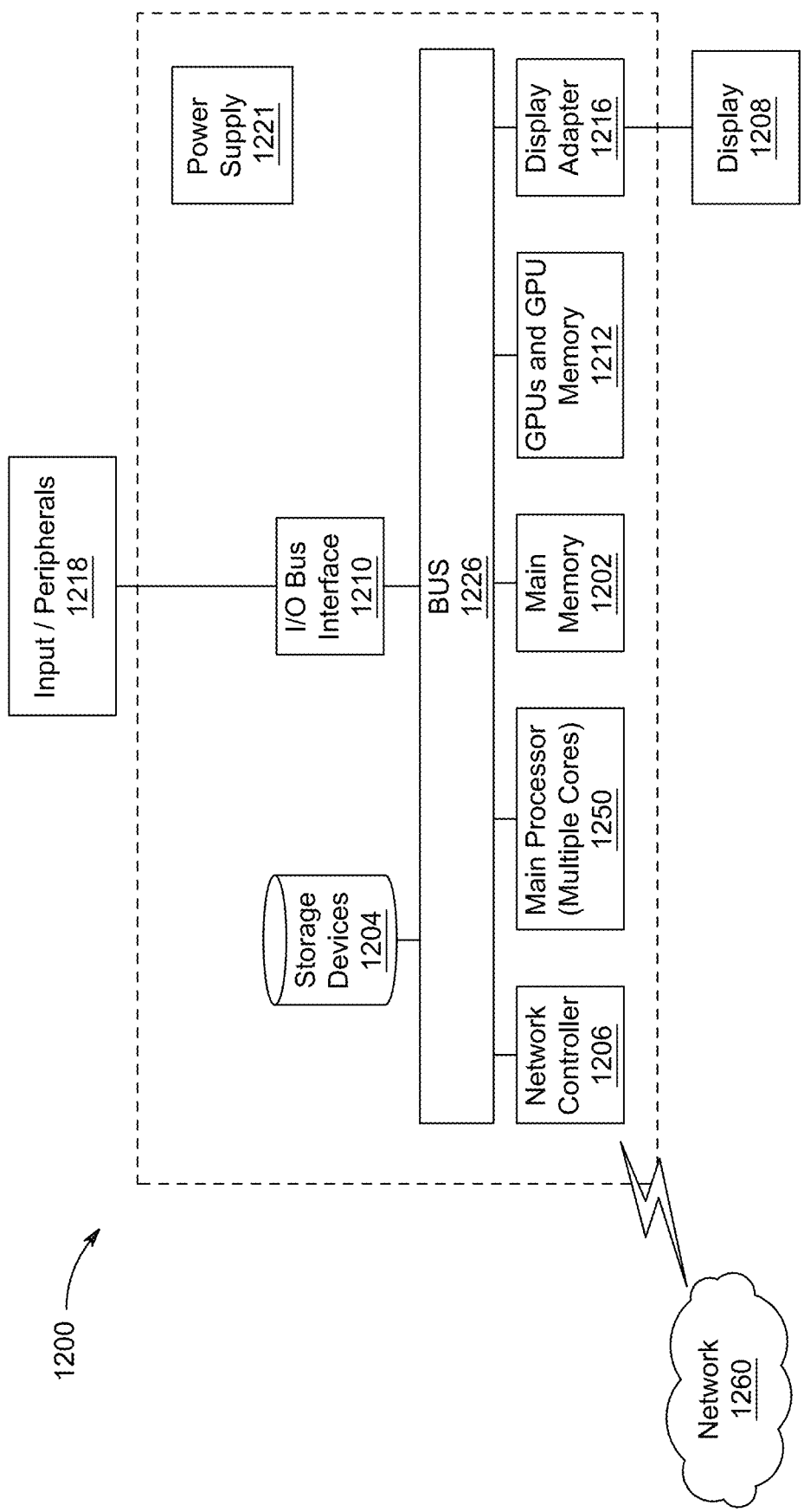
FIG. 12 is an exemplary schematic diagram of a computer system for implementing machine learning training and inference methods of the sign language recognition system, according to certain embodiments.

Referring to FIG. 12, a schematic block diagram of an exemplary computer system 1200 for implementing the machine learning training and inference methods of the sign language recognition system is illustrated, according to an exemplary aspect of the disclosure. The computer system 1200 may be an AI workstation running a server operating system, for example Ubuntu Linux OS, Windows Server, a version of Unix OS, or Mac OS Server. The computer system 1200 may include one or more central processing units (CPU) 1250 having multiple cores. The computer system 1200 may include a graphics board 1212 having multiple GPUs, each GPU having GPU memory. The graphics board 1212 may perform many of the mathematical operations of the disclosed machine learning methods. The computer system 1200 includes main memory 1202, typically random access memory RAM, which contains the software being executed by the processing cores 1250 and GPUs 1212, as well as a non-volatile storage device 1204 for storing data and the software programs. Several interfaces for interacting with the computer system 1200 may be provided, including an I/O Bus Interface 1210, Input/Peripherals 1218 such as a keyboard, touch pad, mouse, Display Adapter 1216 and one or more Displays 1208, and a Network Controller 1206 to enable wired or wireless communication through a network 1260. The interfaces, memory and processors may communicate over the system bus 1226. The computer system 1200 includes a power supply 1221, which may be a redundant power supply.

In some embodiments, the computer system 1200 may include a CPU and a graphics card (such as Nvideo graphics card), in which the GPUs have multiple cores. In some embodiments, the computer system 1200 may include a machine learning engine.

Next, further details of the hardware description of the computing environment of FIG. 1 according to exemplary embodiments is described with reference to FIG. 13.

Figure 13:
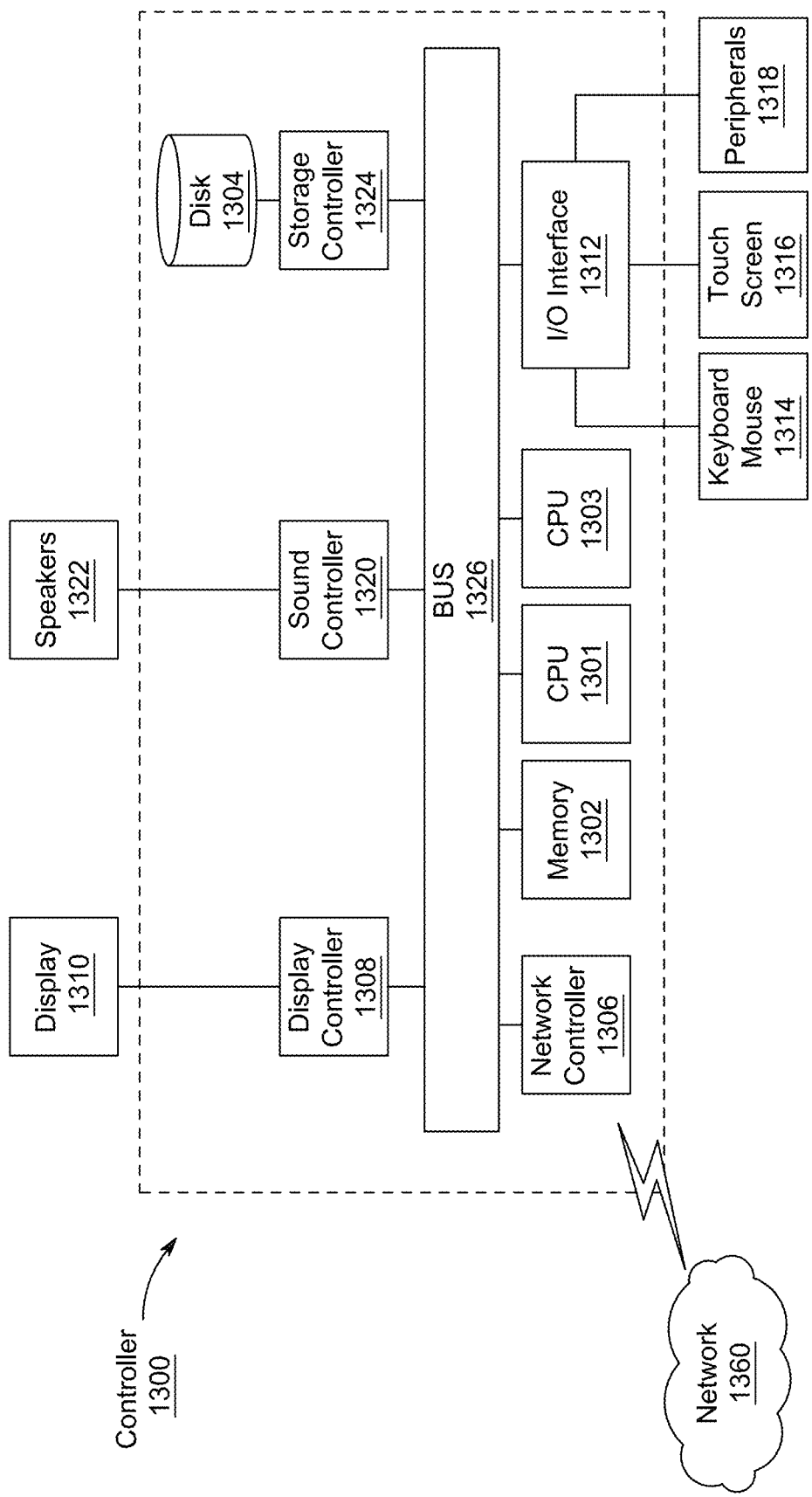
FIG. 13 is an illustration of a non-limiting example of details of computing hardware used in the computing system, according to certain embodiments.

In FIG. 13, a controller 1300 is described as representative of the sign language recognition system 100 of FIG. 1 in which the processing circuitry 110 is a computing device which includes a CPU 1301 which performs the processes described above/below. FIG. 13 is an illustration of a non-limiting example of details of computing hardware used in the computing system, according to exemplary aspects of the present disclosure. In FIG. 13, a controller 1300 is described which is a computing device (that includes the processing circuitry 110) and includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1301, 1303 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of the ordinary skill in the art would recognize.

Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1308, such as a NVIDIA Geforce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general-purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
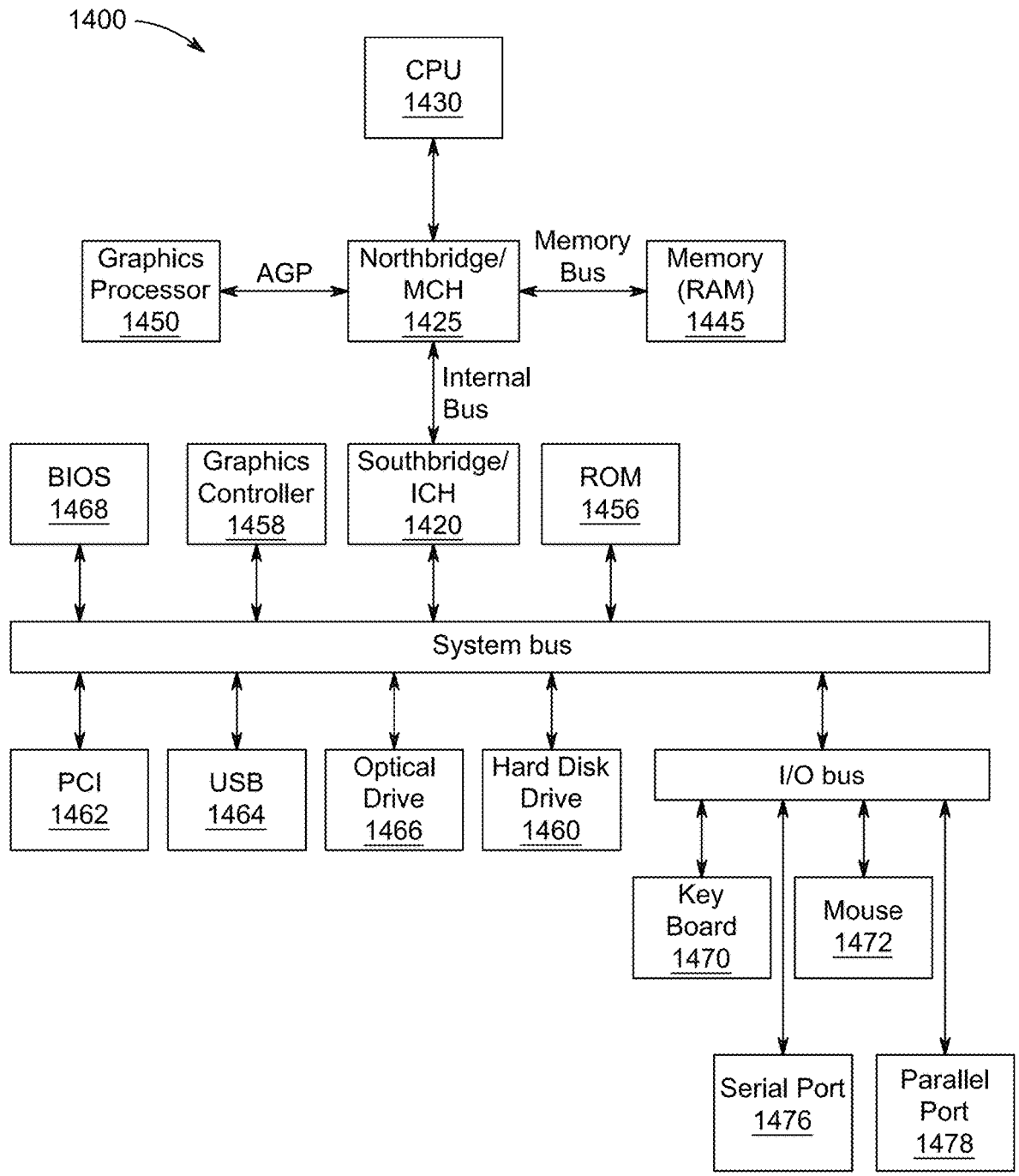
FIG. 14 is an exemplary schematic diagram of a data processing system used within the computing system, according to certain embodiments.

FIG. 14 shows a schematic diagram of a data processing system 1400 used within the computing system, according to exemplary aspects of the present disclosure. The data processing system 1400 is an example of a computer in which code or instructions implementing the processes of the illustrative aspects of the present disclosure may be located. In FIG. 14, data processing system 1480 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

Figure 15:
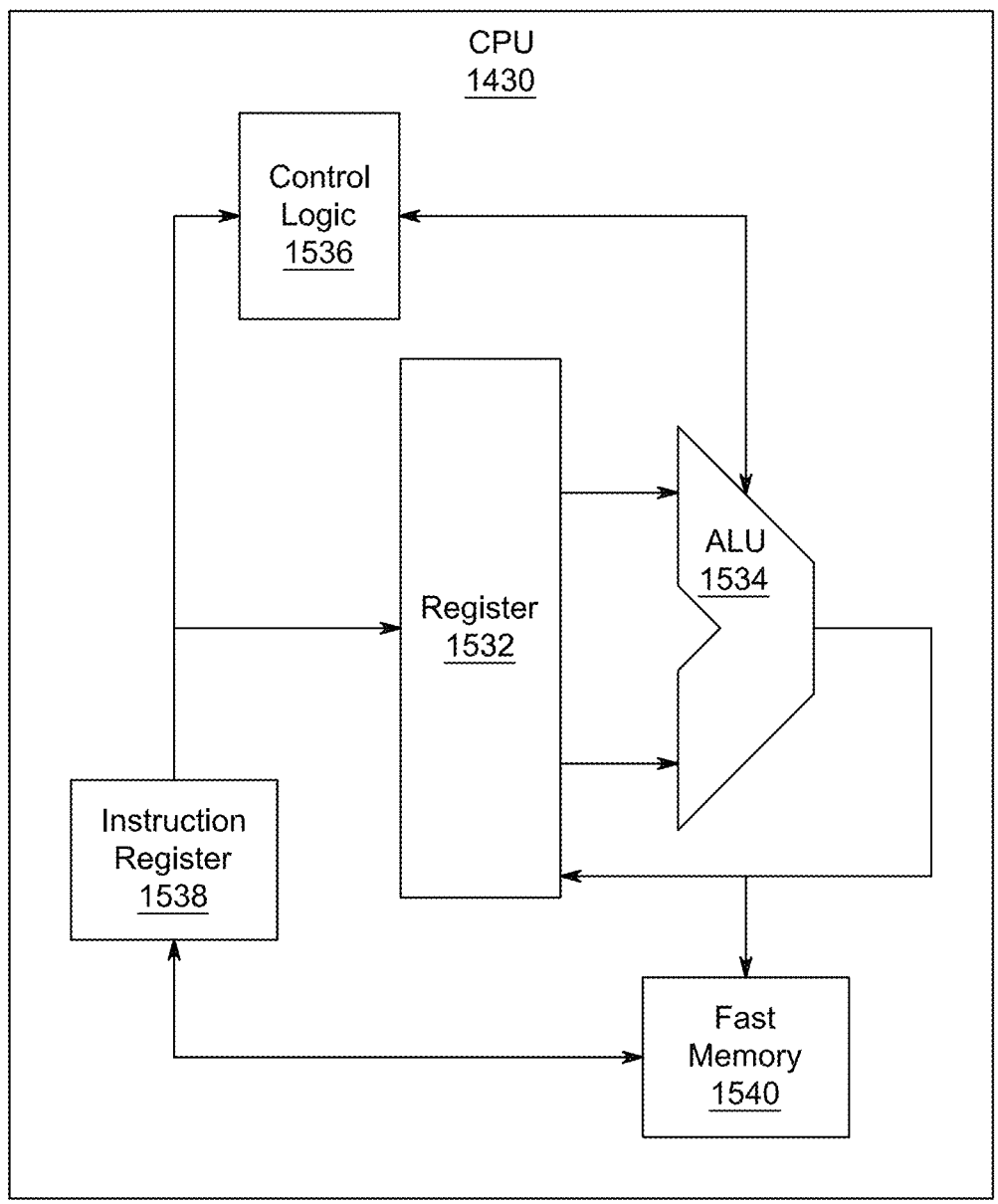
FIG. 15 is an exemplary schematic diagram of a processor used with the computing system, according to certain embodiments.

For example, FIG. 15 shows one aspects of the present disclosure of CPU 1430. In one aspects of the present disclosure, the instruction register 1538 retrieves instructions from the fast memory 1540. At least part of these instructions is fetched from the instruction register 1538 by the control logic 1536 and interpreted according to the instruction set architecture of the CPU 1430. Part of the instructions can also be directed to the register 1532. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain aspects of the present disclosures, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1480 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462.

The PCI devices may include, for example, Ethernet adapters, add-in cards, and PC cards for notebook computers. The Hard disk drive 1460 and CD-ROM 1456 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1460 and optical drive 1466 can also be coupled to the SB/ICH 1420 through a system bus. In one aspects of the present disclosure, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 16:
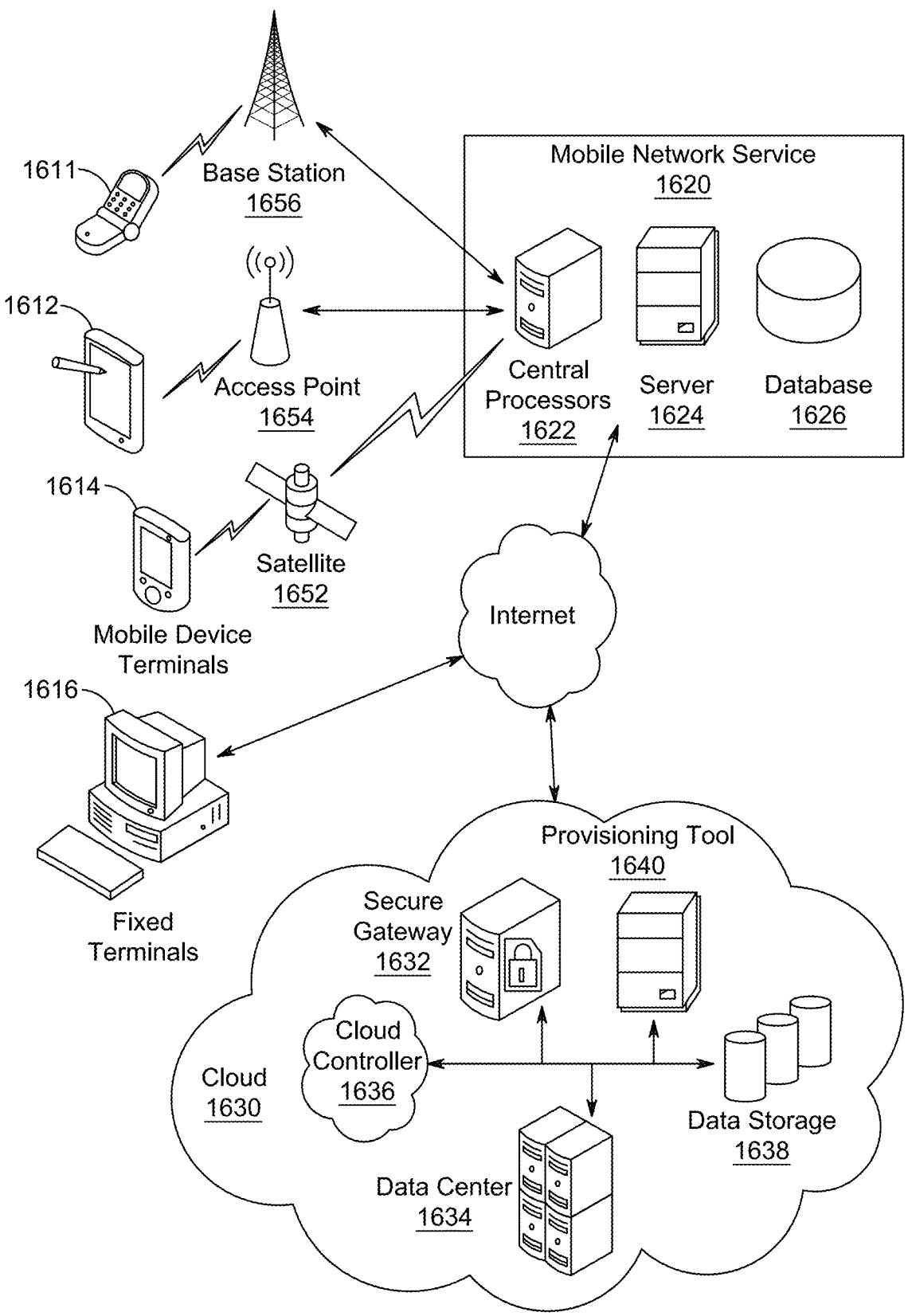
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). More specifically, FIG. 16 illustrates client devices including smart phone 1611, tablet 1612, mobile device terminal 1614 and fixed terminals 1616. These client devices may be commutatively coupled with a mobile network service 1620 via base station 1656, access point 1654, satellite 1652 or via an internet connection. Mobile network service 1620 may comprise central processors 1622, server 1624 and database 1626. Fixed terminals 1616 and mobile network service 1620 may be commutatively coupled via an internet connection to functions in cloud 1630 that may comprise security gateway 1632, data center 1634, cloud controller 1636, data storage 1638 and provisioning tool 1640. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A sign language recognition system, comprising:
   a motion sensor for capturing and recording a dynamic sign language gesture as a sign video stream;
   processing circuitry configured with
   a key postures extractor that captures main postures of the dynamic sign language gesture by extracting key frames in the sign video stream;
   an accumulative video motion (AVM) module that captures motion of the key frames and transforms the motion in an AVM frame into a single AVM image while preserving spatiotemporal information of the sign language gesture; and
   a sign recognition network (SRN) configured as a convolutional network,
   wherein the main postures and AVM image are fed into a two-stream network, and
   wherein features from the two-stream network are concatenated and fed into the SRN for learning fused features and performing classification of the sign language gesture; and
   a display device that outputs the classification as a natural language word.
2. The system of claim 1, wherein the key postures extractor includes
   extracting the key frames by employing hand trajectories captured by tracking hand joint points;

preprocessing the joint points by smoothing hand locations using a median filter to remove outlier joint points;

extracting the key frames by connecting the hand locations during signing to form a polygon, wherein sharp changes in hand locations are represented as vertices of the polygon; and iteratively repeating a reduction algorithm to recompute importance of remaining vertices until N vertices remain in the polygon to obtain a reduced trajectory.

3. The system of claim 1, wherein a stream of the two-stream network is a dynamic motion network (DMN) that uses the main postures to learn the preserved spatiotemporal information of the sign language gesture.

4. The system of claim 3, wherein, in the DMN, the extracted key frames are fed into a combination of Convolutional Neural Network (CNN) and Long Short-Term Memory (LSTM) network to learn and extract the preserved spatiotemporal information from the key frame of the sign language gesture.

5. The system of claim 1, wherein a stream of the two-stream network is an accumulative motion network (AMN) that learns the motion in the AVM image.

6. The system of claim 5, wherein the AVM image is fed into the AMN that uses a convolutional neural network (CNN) network fine-tuned on a pre-trained network.

7. The system of claim 5, wherein the AMN utilizes an accumulated summation between the key frames and produces an RGB image representing a whole sign.

8. The system of claim 1, wherein the processing circuitry is further configured to preserve the spatiotemporal information of the dynamic sign language gesture by fusing the sign's main postures in forward and backward directions to generate the AVM image.

9. A method of recognizing sign language, comprising:
capturing and recording, via a motion sensor, a dynamic sign language gesture as a sign video stream;
capturing, via a key postures extractor, main postures of the dynamic sign language gesture by extracting key frames in the sign video stream;
capturing, via an accumulative video motion (AVM) module, motion of the key frames and transforming the motion in an AVM frame into a single AVM image while preserving spatiotemporal information of the sign language gesture;
feeding the main postures and AVM image into a two-stream network;
concatenating features from the two stream network;
feeding the concatenated features into a SRN for learning fused features;
performing classification of the sign language gesture; and
outputting, via a display device, the classification as a natural language word.

10. The method of claim 9, further comprising, via the key postures extractor,
extracting the key frames by employing hand trajectories captured by tracking hand joint points;
preprocessing the joint points by smoothing hand locations using a median filter to remove outlier joint points;
extracting the key frames by connecting the hand locations during signing to form a polygon, wherein sharp changes in hand locations are represented as vertices of the polygon; and iteratively repeating a reduction algorithm to recompute importance of remaining vertices until N vertices remain in the polygon to obtain a reduced trajectory.

11. The method of claim 9, further comprising:
learning, via a dynamic motion network (DMN), the preserved spatiotemporal information of the sign language gesture.

12. The method of claim 11, further comprising:
in the DMN, feeding the extracted key frames into a combination of Convolutional Neural Network (CNN) and Long Short-Term Memory (LSTM) network to learn and extract the preserved spatiotemporal information from the key frame of the sign language gesture.

13. The method of claim 9, further comprising learning, via an accumulative motion network (AMN), the motion in the AVM image.

14. The method of claim 13, further comprising:
feeding the AVM image into the AMN that uses a convolutional neural network (CNN) network fine-tuned on a pre-trained network.

15. The method of claim 13, further comprising:
computing an accumulated summation between the key frames;
the AMN utilizing the accumulated summation between the key frames and producing an RGB image representing a whole sign.

16. The method of claim 9, further comprising:
preserving the spatiotemporal information of the dynamic sign language gesture by fusing the sign's main postures in forward and backward directions to generate the AVM image.

17. A non-transitory computer readable storage medium storing program instructions, which when executed by computing circuitry, perform a method of recognizing sign language, comprising:
capturing and recording, via a motion sensor, a dynamic sign language gesture as a sign video stream;
capturing, via a key postures extractor, main postures of the dynamic sign language gesture by extracting key frames in the sign video stream;
capturing, via an accumulative video motion (AVM) module, motion of the key frames and transforming the motion in an AVM frame into a single AVM image while preserving spatiotemporal information of the sign language gesture;
feeding the main postures and AVM image into a two-stream network;
concatenating features from the two stream network;
feeding the concatenated features into a SRN for learning fused features;
performing classification of the sign language gesture; and
outputting, via a display device, the classification as a natural language word.

18. The storage medium of claim 17, further comprising, via the key postures extractor,
extracting the key frames by employing hand trajectories captured by tracking hand joint points;
preprocessing the joint points by smoothing hand locations using a median filter to remove outlier joint points;
extracting the key frames by connecting the hand locations during signing to form a polygon, wherein sharp changes in hand locations are represented as vertices of the polygon; and iteratively repeating a reduction algorithm to recompute importance of remaining vertices until N vertices remain in the polygon to obtain a reduced trajectory.

19. The storage medium of claim 17, further comprising: in a dynamic motion network (DMN), feeding the extracted key frames into a combination of Convolutional Neural Network (CNN) and Long Short-Term Memory (LSTM) network to learn and extract the preserved spatiotemporal information from the key frame of the sign language gesture.

20. The storage medium of claim 17, further comprising: preserving the spatiotemporal information of the dynamic sign language gesture by fusing the sign video stream key postures in forward and backward directions to generate the AVM image.

\* \* \* \* \*